United States Patent
Diehl et al.

(10) Patent No.: US 11,833,648 B2
(45) Date of Patent: Dec. 5, 2023

(54) FUNCTIONAL UNIT WITH FASTENING ELEMENT AND FIXING ELEMENT

(71) Applicant: PROFIL Verbindungstechnik Gmbh & Co. KG, Friedrichsdorf (DE)

(72) Inventors: Oliver Diehl, Usingen (DE); Richard Humpert, Bad Nauheim (DE)

(73) Assignee: PROFIL Verbindungstechnik GmbH & Co. KG, Friedrichsdorf (DE)

( * ) Notice: Subject to any disclaimer, the term of this patent is extended or adjusted under 35 U.S.C. 154(b) by 24 days.

(21) Appl. No.: 17/503,868

(22) Filed: Oct. 18, 2021

(65) Prior Publication Data

US 2022/0126422 A1 Apr. 28, 2022

(30) Foreign Application Priority Data

Oct. 20, 2020 (DE) .......................... 102020127590.0

(51) Int. Cl.
  *B25B 5/10* (2006.01)
(52) U.S. Cl.
  CPC ...................................... *B25B 5/10* (2013.01)
(58) Field of Classification Search
  CPC ........................................................ F16B 5/02
  See application file for complete search history.

(56) References Cited

U.S. PATENT DOCUMENTS

| | | | | |
|---|---|---|---|---|
| 5,207,588 | A * | 5/1993 | Ladouceur | F16B 37/062 411/181 |
| 8,360,811 | B2 * | 1/2013 | Aoki | H01R 4/34 439/736 |
| 9,680,239 | B2 * | 6/2017 | Boyer | H01R 4/64 |

FOREIGN PATENT DOCUMENTS

| | | |
|---|---|---|
| DE | 9321296 U1 | 5/1997 |
| DE | 102006062073 A1 | 7/2007 |
| DE | 202017105715 U1 | 11/2017 |
| DE | 102019119627 A1 | 2/2020 |
| WO | 2018206103 A1 | 11/2018 |

* cited by examiner

*Primary Examiner* — Jason L Vaughan
*Assistant Examiner* — Amanda Kreiling
(74) *Attorney, Agent, or Firm* — Gregory J. Gore, Esq.

(57) ABSTRACT

The invention relates to a functional unit for attachment to a workpiece, in particular to a sheet metal part, said functional unit comprising a fastening element having a fastening section for the rotationally fixed fastening of the functional unit to the workpiece and having a head part that adjoins the fastening section in an axial direction and that has a functional section and a head part support surface remote from the fastening section; and a fixing element that can be fixed to the functional section of the head part of the fastening element by means of a rotational movement and that has a fixing element support surface that, in a state of the fixing element installed at the fastening element, faces the head part support surface such that an attachment part can be clamped between the head part support surface and the fixing element support surface.

21 Claims, 25 Drawing Sheets

FUNCTIONAL UNIT WITH FASTENING ELEMENT AND FIXING ELEMENT

Figure 1A:
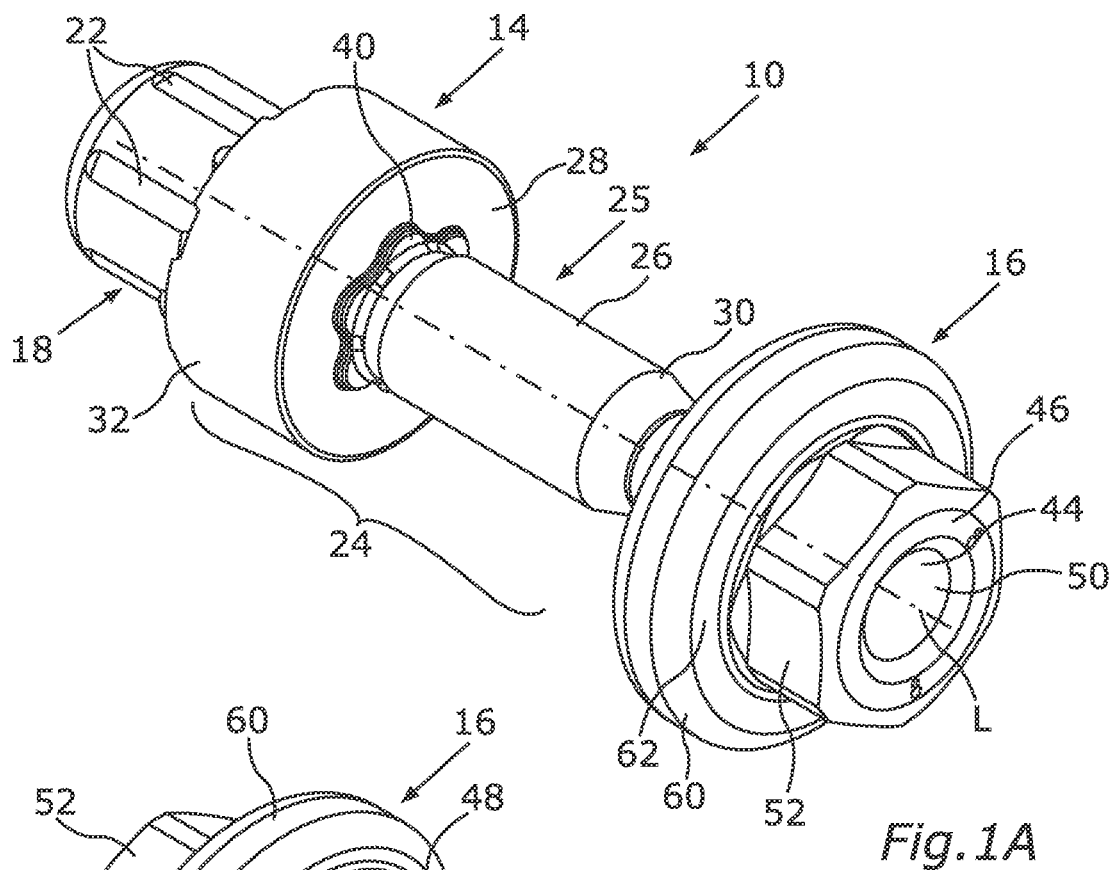

The present invention relates to a functional unit for attachment to a workpiece, in particular to a sheet metal part, said functional unit comprising a fastening element having a fastening section for the rotationally fixed fastening of the functional unit to the workpiece and having a head part that adjoins the fastening section in an axial direction and that has a functional section and a head part support surface remote from the fastening section. The functional unit further comprises a fixing element that can be fixed to the functional section of the head part of the fastening element by means of a rotational movement and that has a fixing element support surface that, in a state of the fixing element installed at the fastening element, faces the head part support surface such that an attachment part can be clamped between the head part support surface and the fixing element support surface.

Such functional units are generally known from the prior art and are, for example, used to fasten a cable lug in a clamping manner to a workpiece by means of the fastening element and the fixing element. The functional unit, for example, serves to fix a ground cable to a workpiece.

The fastening element can, for example, be configured as a nut element or as a bolt element. To prevent the attachment part, for example the cable lug, from rotating along on a tightening of the fixing element at the fastening element, which makes the assembly more difficult and whereby a cable fastened to said attachment part can ultimately even be damaged, the fastening element can have a protection against rotation. For example, cage-like projections can be provided at the fastening element and prevent a further rotation of the cable lug at least at the positions marked by the projections. Alternatively, the design of a ground bolt with form-fitting features can also be provided at the functional section, whereby a specific cable lug having a suitable cut-out can be received in a form-fitted manner. However, the use of such fastening elements is only possible in combination with attachment parts manufactured specifically for this purpose and is therefore complex and/or expensive. In addition, the alignment of the attachment part is only possible in accordance with the pitches predefined by the cage or shape features and is thus inflexible.

It is an object of the present invention to provide a functional element for the fastening of an attachment part in a manner secure against rotation, said functional element comprising a fastening element and a fixing element and being characterized by a universal applicability, a flexible use, and a simple and inexpensive manufacture.

The object is satisfied by a functional unit having the features of claim 1, and in particular in that the head part support surface of the fastening element has at least one feature providing security against rotation that projects from the surface and that is configured to at least sectionally deform the material of the attachment part. The fastening element and/or the fixing element is/are preferably composed of metal.

The invention is based on the general idea that a fastening secure against rotation of an attachment part, for example of a cable connection device or a cable lug, takes place by means of the functional unit in accordance with the invention, wherein no features deviating from a standard design, for example specific shaping features, have to be formed at the attachment part itself since the protection against rotation is imparted into the attachment part by the feature providing security against rotation of the fastening element during the fastening. The attachment part can be attached to the fastening element in any desired orientation or alignment that best corresponds to the spatial conditions of use. Due to the fixing of the fixing element to the fastening element by means of a rotational movement, for example by a tightening, at the fastening element, the material of the attachment part is deformed by pressing the at least one feature providing security against rotation into the attachment part and the attachment part is thus fixed in the selected orientation. This ensures a universal applicability of the functional unit with numerous commercially available attachment parts, whereas it can also be flexibly used in spatially restricted installation situations.

The sheet metal part section can, for example, be a body part. The fastening element and/or the fixing element is/are preferably produced from a metallic, electrically conductive material such that, by means of the functional unit, an electrical contact can be established between the workpiece and the attachment part or a cable fastened to the attachment part. The functional unit can in particular serve as a ground bolt or a ground nut having a fixing element.

A longitudinal axis of the fastening element extends from the fastening section for fastening the fastening element to the workpiece to the head part. A head part support surface of the fastening element extending in a radial direction is typically arranged perpendicular to the longitudinal axis.

In a state of the fixing element fixed to the fastening element, the fixing element support surface advantageously at least sectionally extends in parallel with the head part support surface. The fixing element can be screwed to the fastening element and can in particular be screwed onto the fastening element to such an extent that the fixing element support surface and the head part support surface can at least partly be brought into an areal contact with one another. An attachment part introduced between the fixing element support surface and the head part support surface can thus be fixed in a clamping manner to the functional unit by tightening the fixing element, wherein attachment parts having different axial thicknesses can be used without problem.

To fasten the functional element in the component in a rotationally fixed manner, i.e. in a manner secure against rotation, features providing security against rotation can be provided, for example rib-shaped elevated portions and/or groove-like depressions can be attached, in the region of the fastening section, in particular on an outer contour of the fastening section. Said features providing security against rotation can in particular extend in the direction of the longitudinal axis of the fastening element. Alternatively or additionally, similar features, in particular elevated portions or depressions, can be arranged in the region of the head part, in particular on a workpiece contact surface of the head part facing the workpiece in an installed state.

The fastening section can be configured for the connection to workpieces of different types, wherein in particular an adapted axial extent of the fastening section can be provided for workpieces having different thicknesses.

Advantageous embodiments of the invention can be seen from the description, from the dependent claims, and from the drawings.

In accordance with an embodiment, the head part support surface is designed in ring shape and in this way provides a non-orientation-dependent, rotationally symmetrical support surface for—in the absence of an attachment part—the fixing element or the attachment part itself. The head part support surface can in particular extend in a ring shape around the functional section of the fastening element and can be arranged concentrically thereto.

The at least one feature providing security against rotation can be formed in different ways. For example, a plurality of features providing security against rotation can be provided that are arranged distributed, in particular in a ring shape, in a peripheral direction, in particular at uniform angular intervals and preferably at equal radial spacings from the longitudinal axis of the unit. For example, the at least one feature providing security against rotation can comprise at least one, but in particular a plurality of or numerous individual tips or spikes that project from the head part support surface and that can be arranged in a ring shape, in particular concentrically, around the functional section of the fastening element.

Instead of the spikes, features providing security against rotation that are formed differently can generally also be attached in a ring shape to the head part support surface, for example tooth-like or wedge-shaped structures, structures formed like flowers, polygonal structures, ribs extending in the radial direction, etc. Structures that are not rotationally symmetrical in the sense that they can be mapped onto themselves by any desired angle of rotation between 0° and 360° are in particular suitable as features providing security against rotation. However, a rotational symmetry, i.e. the possibility of converting the feature providing security against rotation into itself by a rotation about one or different discrete angles, is possible. A combination of different features providing security against rotation is likewise conceivable.

The at least one feature providing security against rotation does not necessarily have to completely surround the functional section of the fastening element. It can also be arranged only in a specific angular region of the head part support surface and can, for example, be formed as at least one step or ramp in the head part support surface.

In accordance with a further embodiment, the fixing element support surface has at least one depression or recess, in particular having a rotational symmetry, in particular a rotation symmetry, that is configured, in a state of the fixing element installed at the fastening element, to receive the at least one feature providing security against rotation projecting from the head part support surface while the fixing element support surface is at least sectionally in contact with the head part support surface. The functional unit can thereby also be present in the absence of an attachment part, for example for transport, storage or fastening purposes, as a complete unit assembled from a fastening element and a fixing element, in particular captively screwed to one another. The depression or recess of the fixing element can protectively surround the features providing security against rotation of the head part support surface until an attachment part is to be applied to the fastening element and attached thereto in a manner secure against rotation.

A radial width of the feature or features providing security against rotation is in this respect preferably smaller than a radial width of the head part support surface such that the head part support surface extends at least at the radial inner side or radial outer side beyond the at least one feature providing security against rotation and can be brought into contact with the fixing element support surface.

In an embodiment of a particular simple design, the depression or recess of the fixing element support surface can comprise at least one ring-shaped peripheral groove. Such recesses are particularly easy to produce and can be universally used in order even to receive features providing security against rotation of different types. The at least one groove running around in a ring shape can be arranged concentrically to the at least one feature providing security against rotation, and in particular to the longitudinal axis of the fixing element, and can be arranged in the radial direction—in a manner complementary to the at least one feature providing security against rotation—at at least one suitable position of the fixing element support surface, e.g. at the radial inner side, at the radial outer side, and/or therebetween.

The at least one feature providing security against rotation projecting from the head part support surface can surround the functional section at the radial outer side, and can in particular be formed directly adjacent to the functional section. This arrangement can be advantageous from a technical production aspect, wherein advantages in the manufacture of the corresponding fixing element can in particular also result, in particular if the feature providing security against rotation is directly adjacent to the functional section.

For a simple fastening in the workpiece, the fastening section can comprise a deformable rivet section, in particular a cylindrical deformable rivet section. Said deformable rivet section can be provided to be inserted into a prefabricated hole in the workpiece and can be shaped such that a fastening of the fastening element with pull-out security is produced. Alternatively, the fastening element can also have a section for a bonded connection to the workpiece, for example, a welding section.

In accordance with an embodiment, the fastening element is a bolt element whose functional section comprises a shaft part adjoining the head part support surface at the side thereof in the axial direction. The shaft part preferably extends in the axial direction—at the side of the fastening element remote from the fastening section—beyond the head part support surface and is configured to receive an attachment part and the fixing element.

The shaft part preferably has an external thread. The external thread does not necessarily have to extend over the total length of the shaft part, but can, for example, be arranged spaced apart from the head part support surface in the axial direction, in particular by the spacing of an axial extent of a typical attachment part. A diameter of the shaft part is typically smaller than the diameter of the head part support surface. The shaft part preferably also extends less far in the radial direction toward an outer side of the fastening element than the at least one feature providing security against rotation.

Alternatively, the fastening element can be a nut element whose functional section comprises an internal thread arranged in the head part, in particular wherein the internal thread extends in the axial direction from the head part support surface in the direction of the fastening section. A corresponding fixing element can be configured as a fixing screw that can be screwed into the nut element by means of an external thread complementary to the internal thread. The attachment part can be placed onto the head part support surface and can be fastened to the nut element by means of the fixing screw.

In particular if the fastening element is configured as a bolt element, the fixing element can be configured as a fixing nut that has an axial passage opening, which is in particular centrally arranged and which extends from a radially extending first end face to the radially extending fixing element support surface, and that has an internal thread. The internal thread can be complementary to an external thread of a shaft part of a corresponding bolt element. In addition, the fixing nut can have a radially extending flange, in particular wherein the fixing element support surface is arranged at the flange.

The fixing nut can have an engagement surface for a screwing tool at the side of the first end face and the flange can have a surface, in particular a ring-shaped surface, for a punch of a setting head. The engagement surface for the screwing tool can, for example, comprise a polygonal outer contour, in particular a hexagonal outer contour, of the fixing nut. The ring-shaped surface can, at the flange side, project radially beyond the engagement surface for the screwing tool in order to be accessible for the punch of the setting head. The ring-shaped surface of the flange can in particular have a larger diameter than the head part support surface of the bolt element.

To be able to introduce the fastening element into the workpiece without a complex and/or expensive predrilling or prefabrication of a hole, the fastening element can have a self-piercing fastening section that itself cuts through the workpiece during the setting. The self-piercing fastening section can differ from a cylindrical shape and can, for example, be polygonal in order to establish a rotationally fixed connection to the workpiece.

A further aspect of the invention relates to a component assembly, comprising a functional unit as described above; and a workpiece, wherein the fastening element of the functional unit is attached in a form-fitted manner to the workpiece by a shaping process. The fastening section of the fastening element has typically penetrated the workpiece and can advantageously be radially widened or beaded over on a side of the fastening section remote from the head part such that said fastening section engages behind the workpiece and thus provides a connection with pull-out security.

The component assembly can furthermore comprise an attachment part, in particular a cable connection device or a cable lug, wherein the attachment part is clamped between the head part support surface of the fastening element and the fixing element support surface of the fixing element. The attachment part is in particular in engagement with the at least one feature providing security against rotation of the head part support surface and is rotationally fixedly secured by it. The at least one feature providing security against rotation has preferably dug into the material of the attachment part and has established a form-fitted connection with the attachment part in this manner. The at least one feature providing security against rotation was therefore transferred to the attachment part after the attachment, in particular during the fastening of the fixing element by a rotational movement.

The feature providing security against rotation is particularly reliably imparted into the material of the attachment part and the feature providing security against rotation is effected when the material of the at least one feature providing security against rotation, in particular of the head part, of the fastening element and/or of the fixing element, has a higher strength than that of the attachment part.

A further aspect of the invention relates to a method of manufacturing a component assembly in accordance with a preceding embodiment, in which (i) a fastening element of a functional unit in accordance with a previously described embodiment is pressed into or punched into a workpiece by means of a punch of a setting apparatus. In accordance with an embodiment of the method in accordance with the invention, the pressing in or punching in of the fastening element (ii) takes place while the fixing element of the functional unit is dismantled, wherein the punch has a contact surface that (iii) is at least sectionally brought into engagement with the head part support surface of the fastening element to transmit a press-in force to the fastening element, wherein (iv) the contact surface of the punch has at least one depression or recess, in particular having a rotational symmetry or rotation symmetry, in which the at least one feature providing security against rotation projecting from the head part support surface is received during the pressing in or punching in. Damage to the at least one feature providing security against rotation during the pressing in of the fastening element can be prevented in this manner.

In accordance with a further embodiment in accordance with the invention, a method of manufacturing a component assembly in accordance with an embodiment described above is provided, in which (i) a fastening element of a functional unit, but without a feature providing security against rotation on the head part support surface, is pressed into a workpiece by means of a punch of a setting apparatus. The fastening element of the functional unit comprises a fastening section for the rotationally fixed fastening of the functional unit to the workpiece; and a head part that adjoins the fastening section in an axial direction and that has a functional section and a head part support surface remote from the fastening section. Moreover, the functional unit comprises a fixing element that can be fixed to the functional section of the head part of the fastening element by means of a rotational movement and that has a fixing element support surface that, in a state of the fixing element installed at the fastening element, faces the head part support surface such that an attachment part can be clamped between the head part support surface and the fixing element support surface. The method in accordance with this embodiment is performed (ii) while the fixing element of the functional unit is dismantled, wherein the punch has a contact surface that (iii) is brought into engagement with the head part support surface of the fastening element to transmit a press-in force to the fastening element, wherein (iv) the contact surface of the punch has recesses which serve as a negative mold for at least one feature providing security against rotation and into which material of the head part support surface flows during the pressing of the contact surface onto the head part support surface such that at least one feature providing security against rotation is formed on the head part support surface of the fastening element during the pressing in.

In accordance with this method, the at least one feature providing security against rotation of the head part support surface is formed only during the pressing of the fastening element into the workpiece. In this way, it can be ensured, on the one hand, that the feature providing security against rotation is intact and not damaged when the attachment part is attached directly afterwards. On the other hand, a particularly flexible use of standardized fastening elements is possible in order to form an effective security against rotation. In this case, completely standard nuts or screws can be used as fixing elements.

In accordance with a further embodiment, a method of manufacturing a component assembly in accordance with an embodiment described above is provided, in which (i) a fastening element of a functional unit (10) in accordance with at least one previously described embodiment is pressed into a workpiece by means of a punch of a setting apparatus (ii) while the fixing element of the functional unit is installed at the fastening element such that the at least one feature providing security against rotation projecting from the head part support surface is received in the at least one depression or recess of the fixing element support surface (iii) while the fixing element support surface is at least sectionally in contact with the head part support surface, wherein (iv) the punch has a contact surface that is at least sectionally brought into engagement with the fixing element, in particular with a flange of the fixing element, for an indirect transmission of a press-in force or punch-in force to the fastening element. The functional unit can thus be inserted into the workpiece as a whole, i.e. comprising the fastening element and the associated fixing element. The at least one feature providing security against rotation of the fastening element is protected against damage by the fixing element during the pressing or the punching of the functional unit into the workpiece. A separate provision of fixing element is not necessary, which simplifies the handling and attachment of the functional unit and subsequently of the attachment part.

Figure 1B:
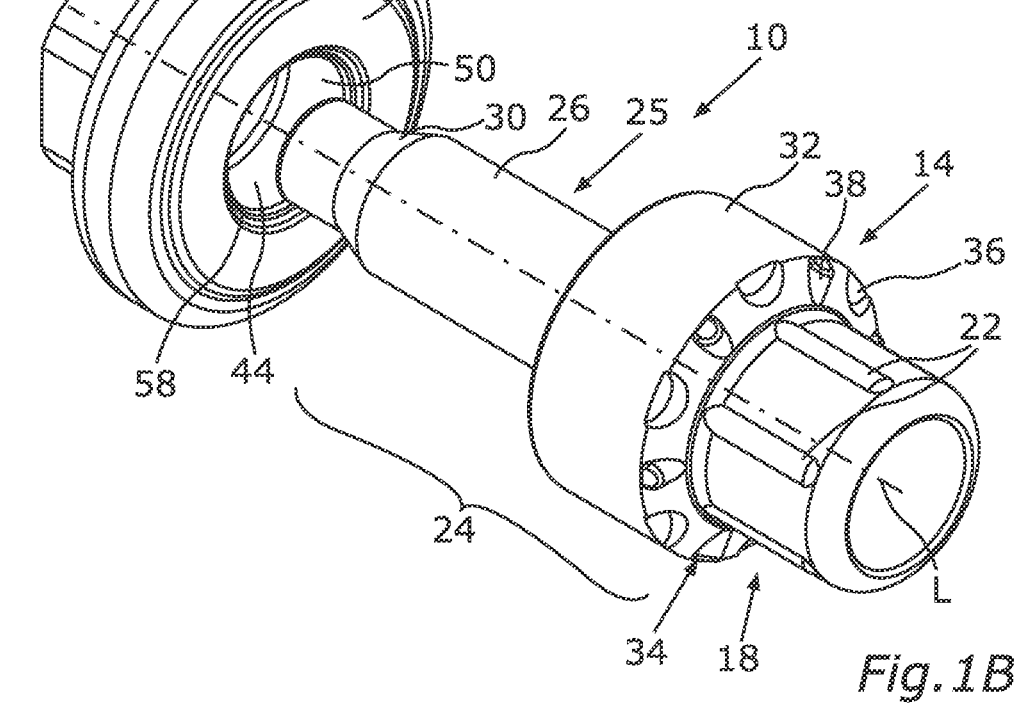
Figure 1C:
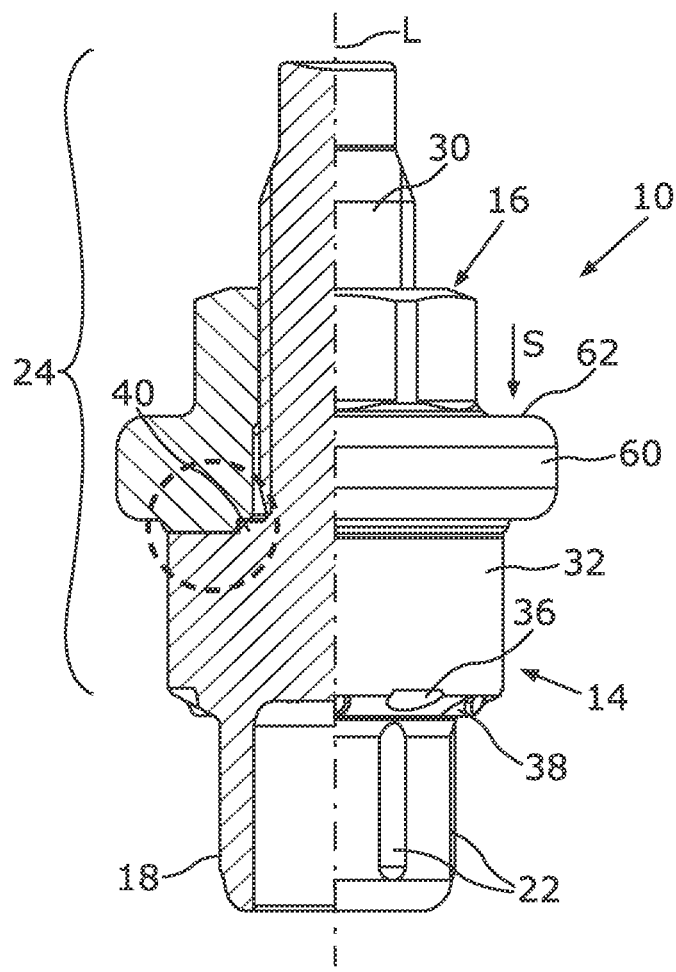
Figure 1D:
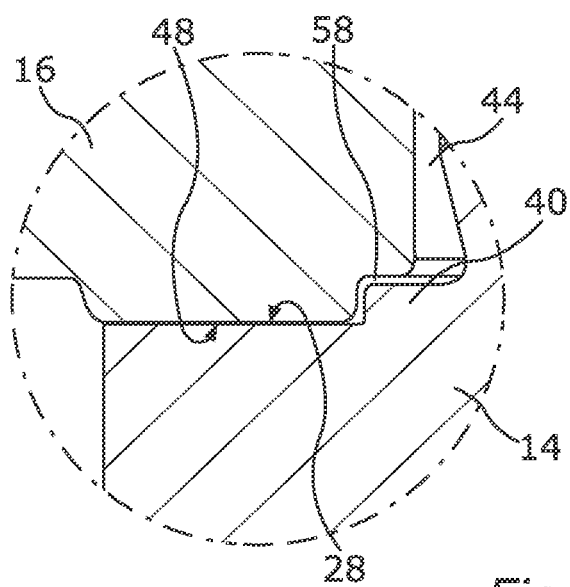
Figure 1E:
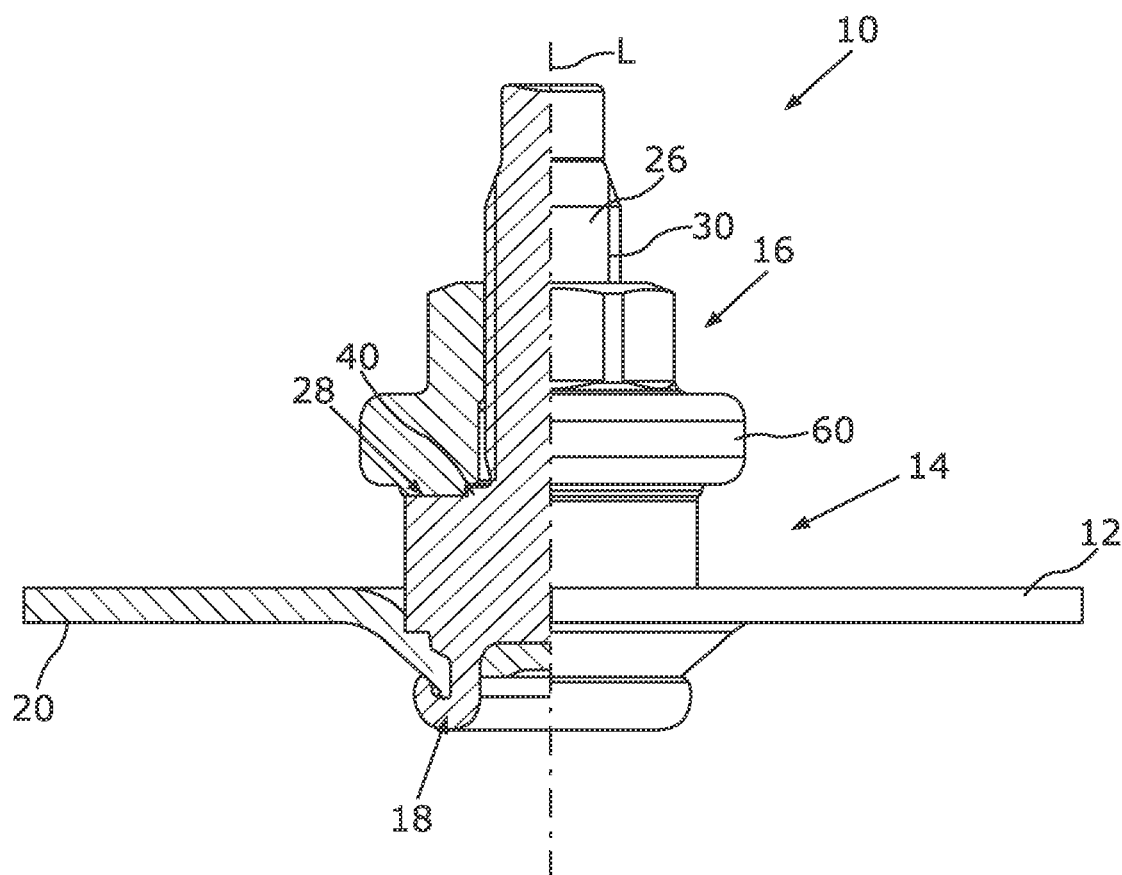
Figure 1F:
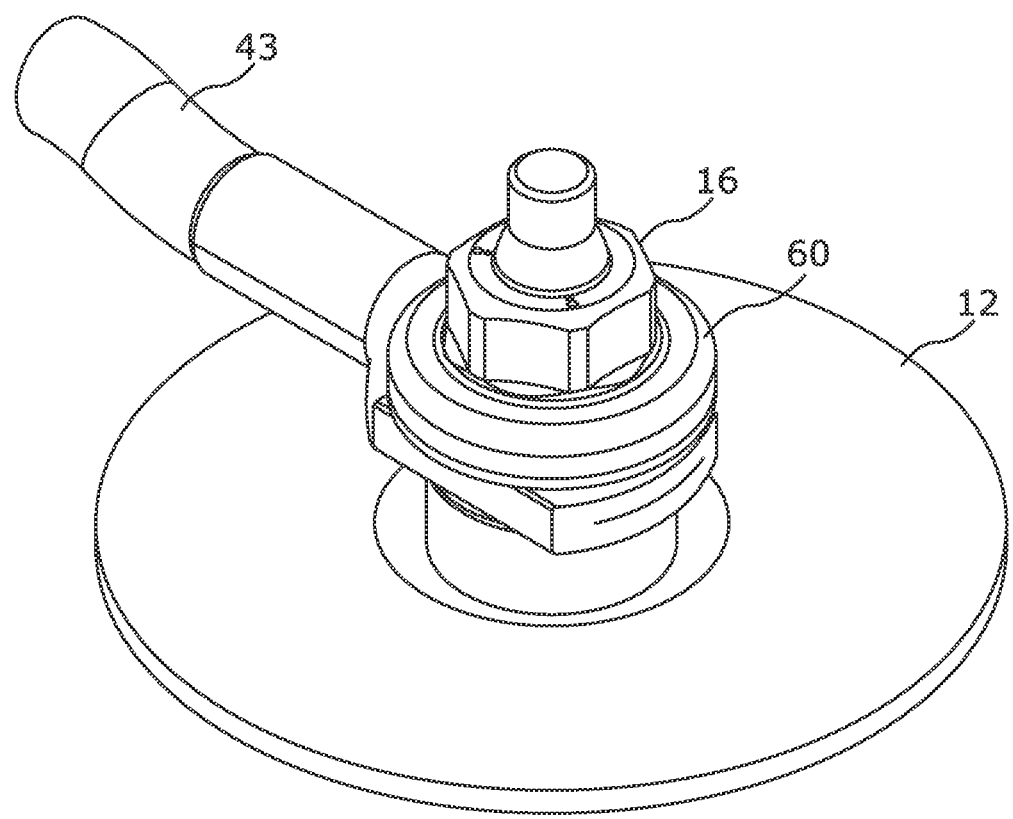
Figure 1G:
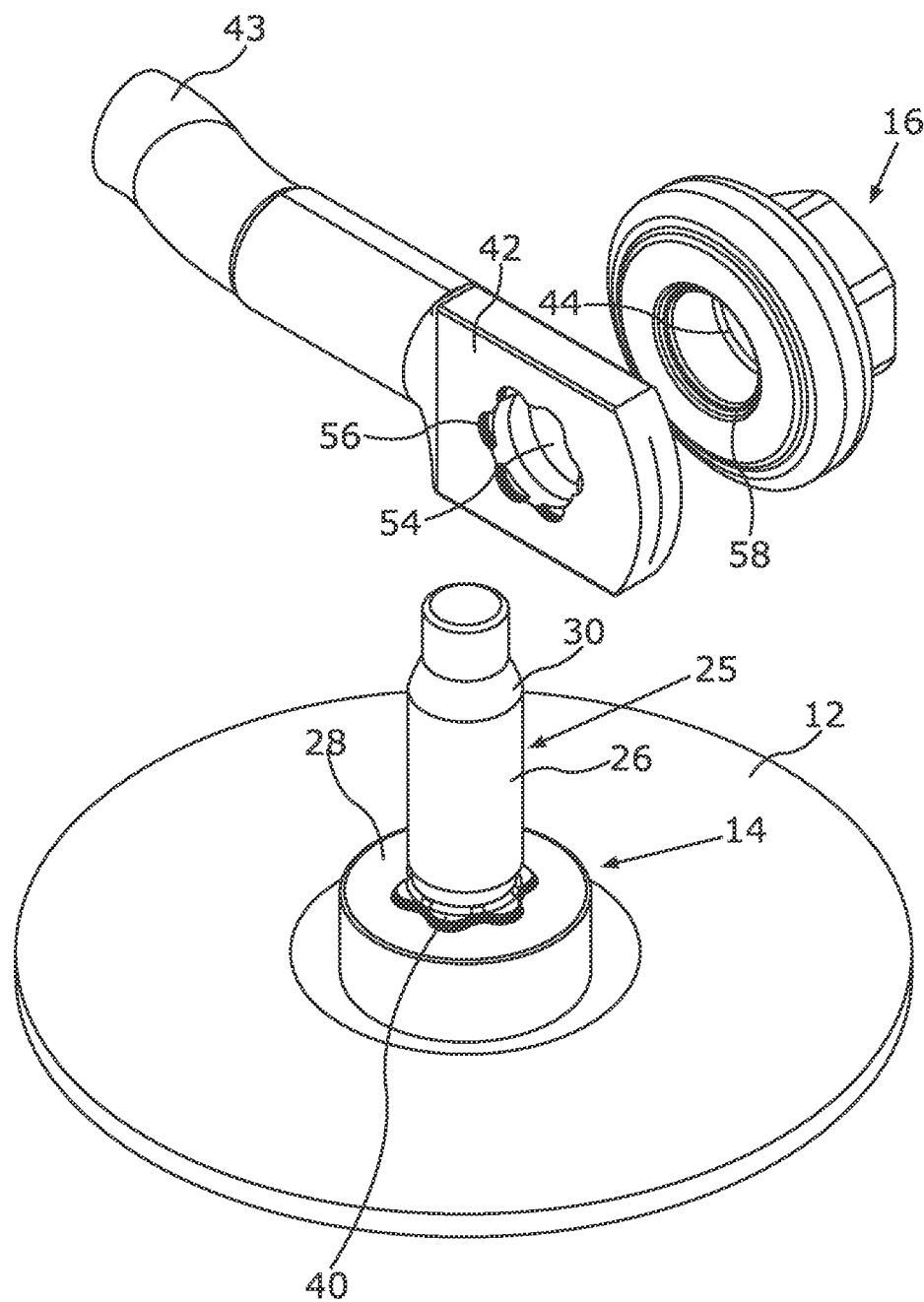
Figure 2A:
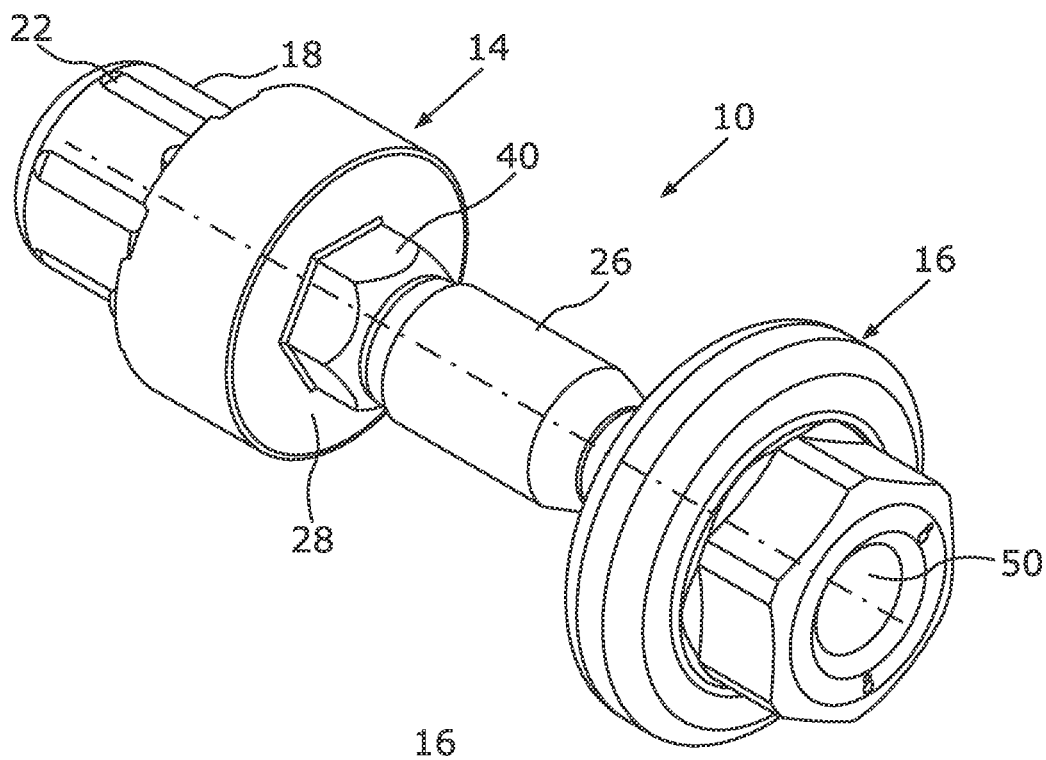
Figure 2B:
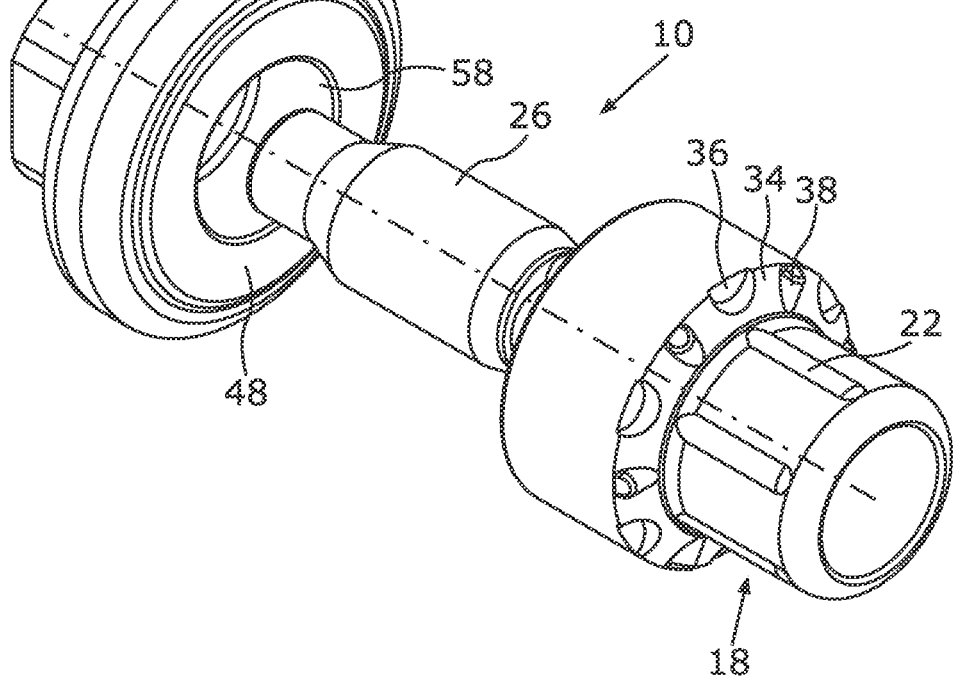
Figure 2C:
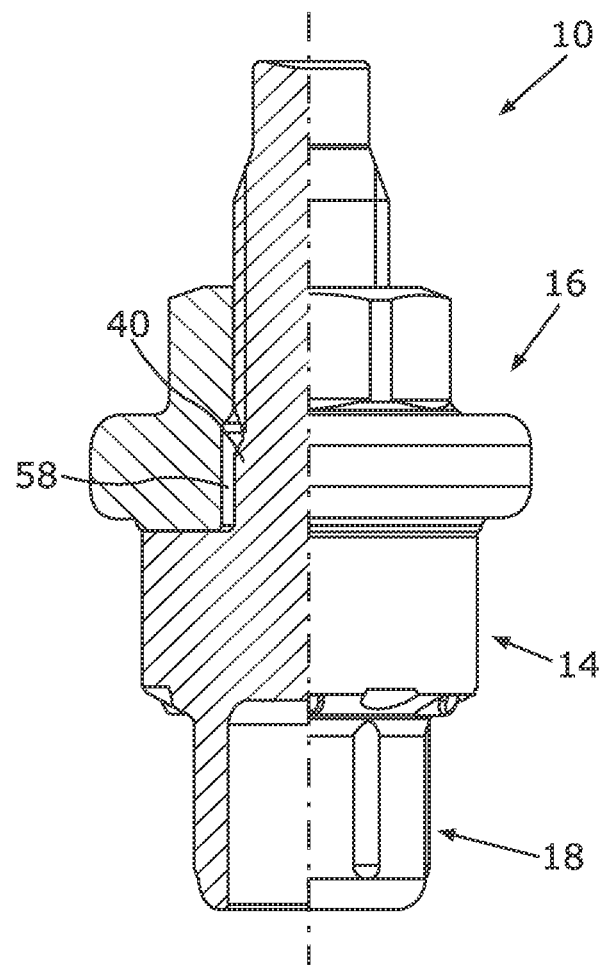
Figure 2D:
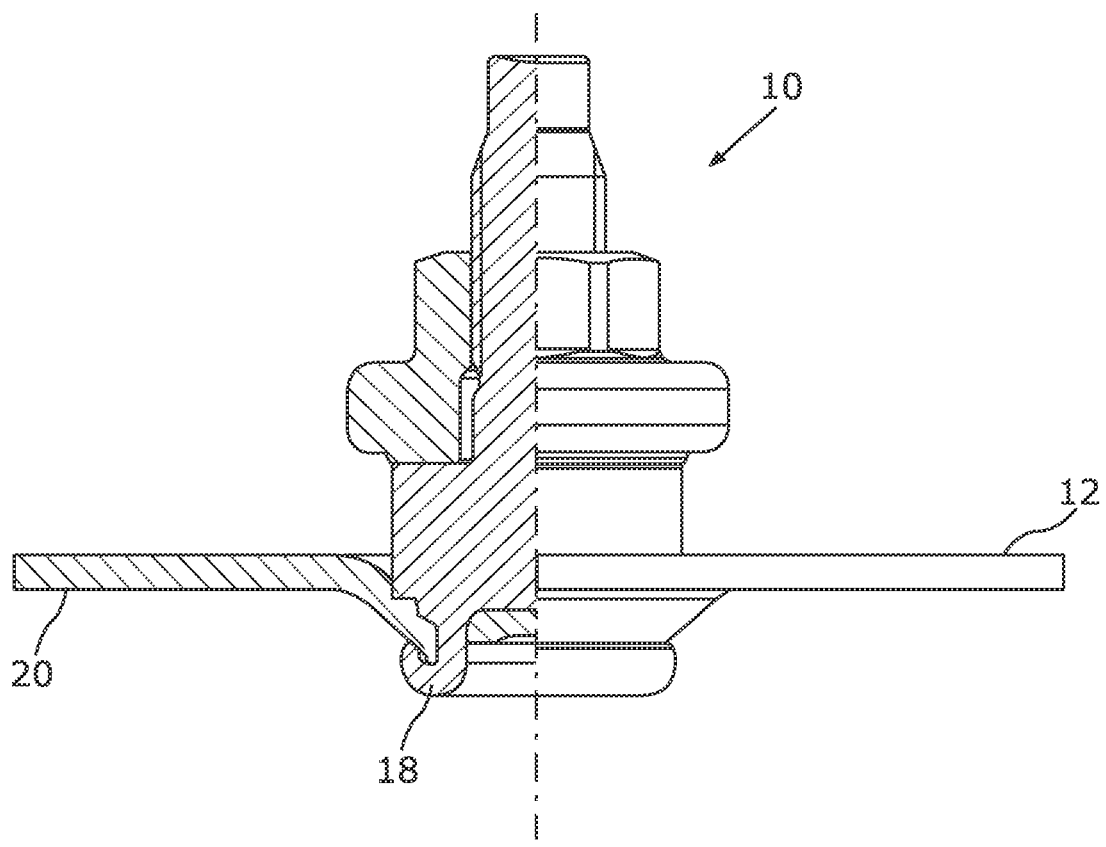
Figure 2E:
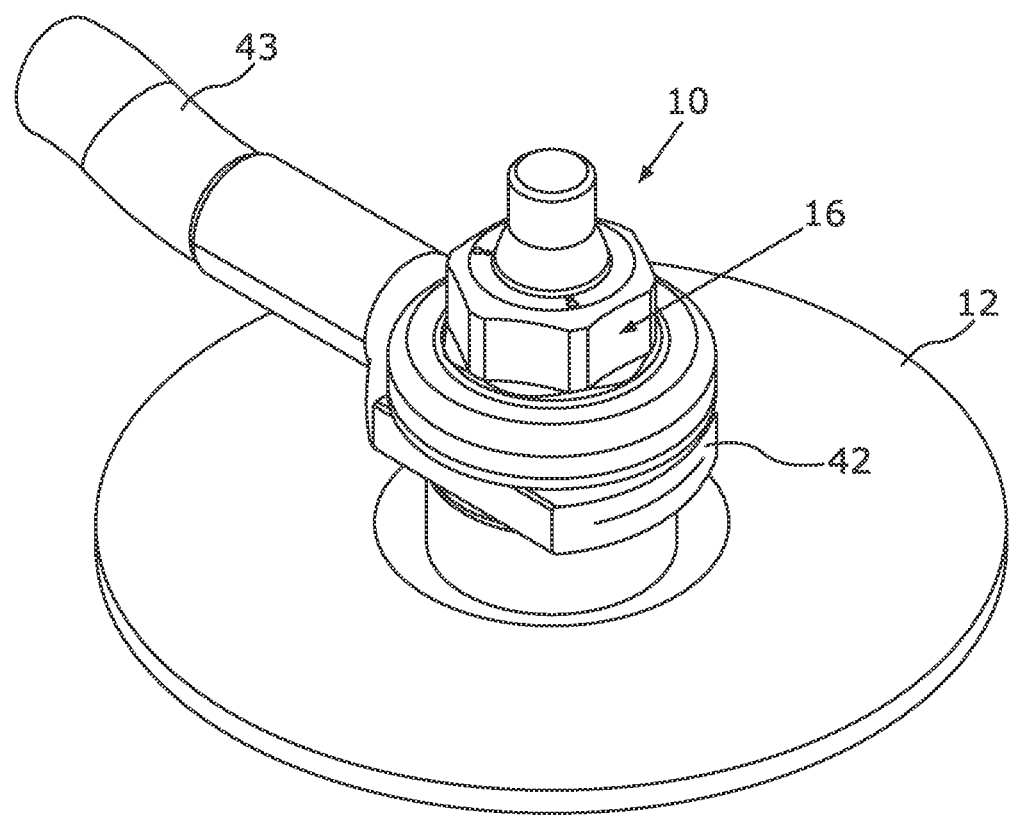
Figure 2F:
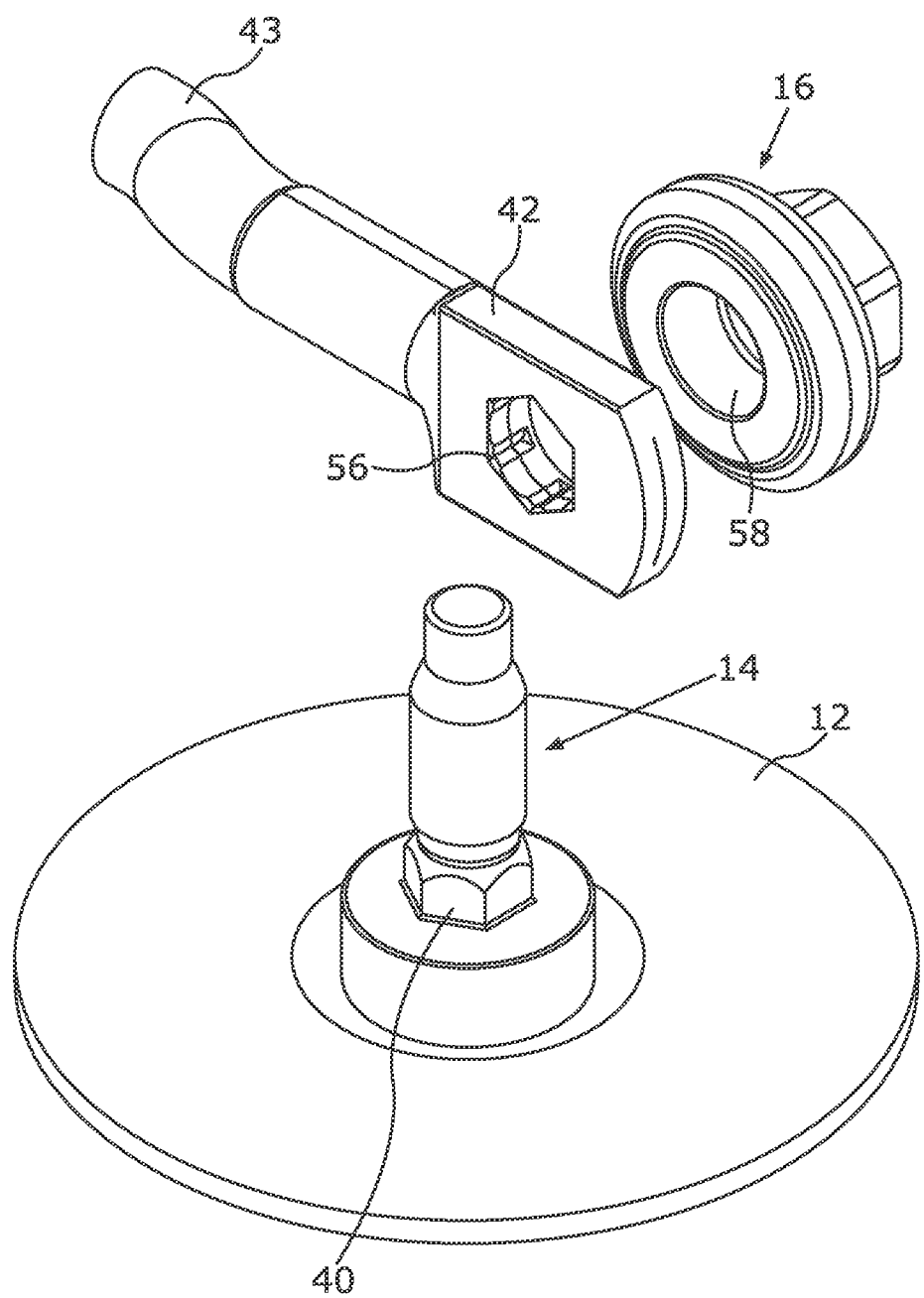
Figure 3A:
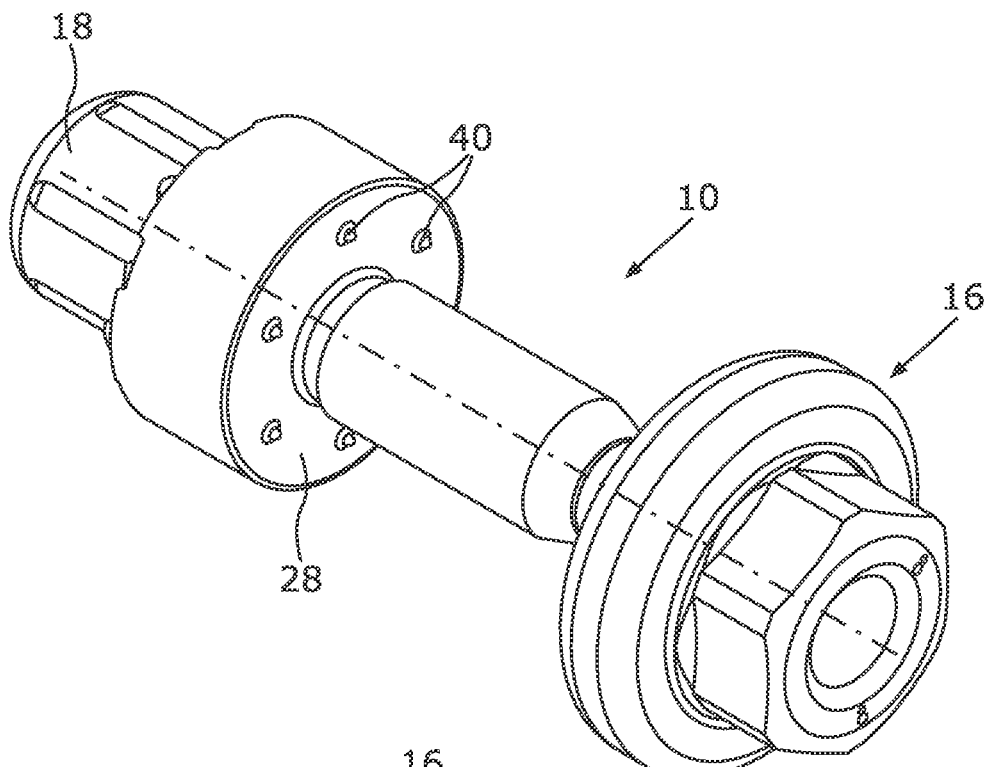
Figure 3B:
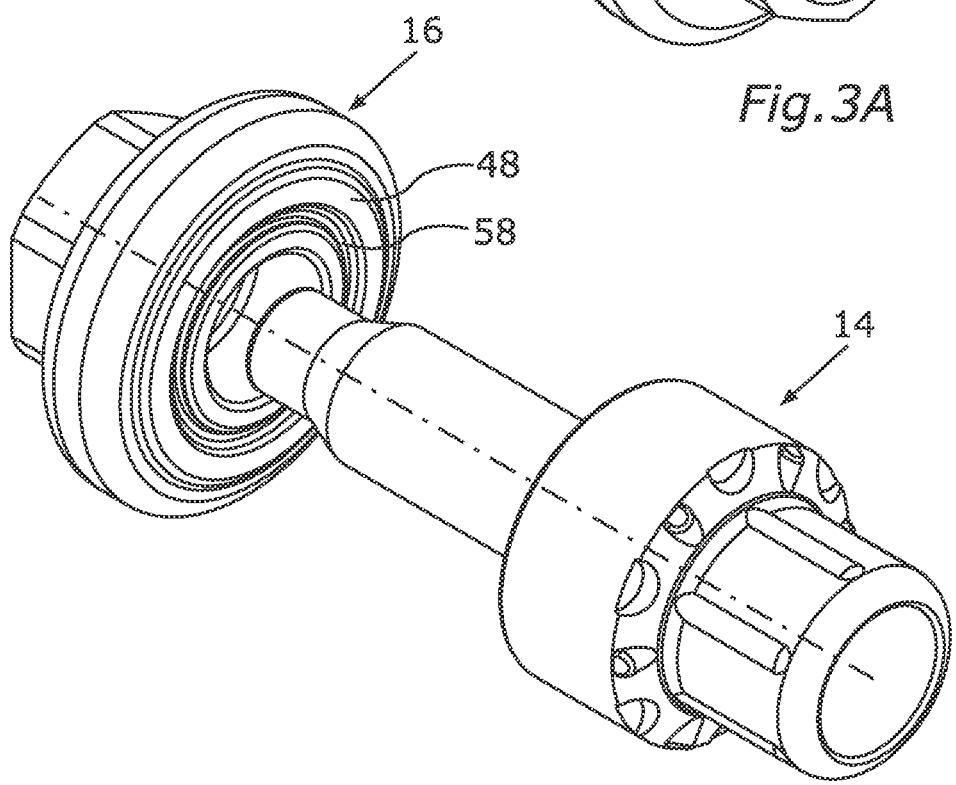
Figure 3C:
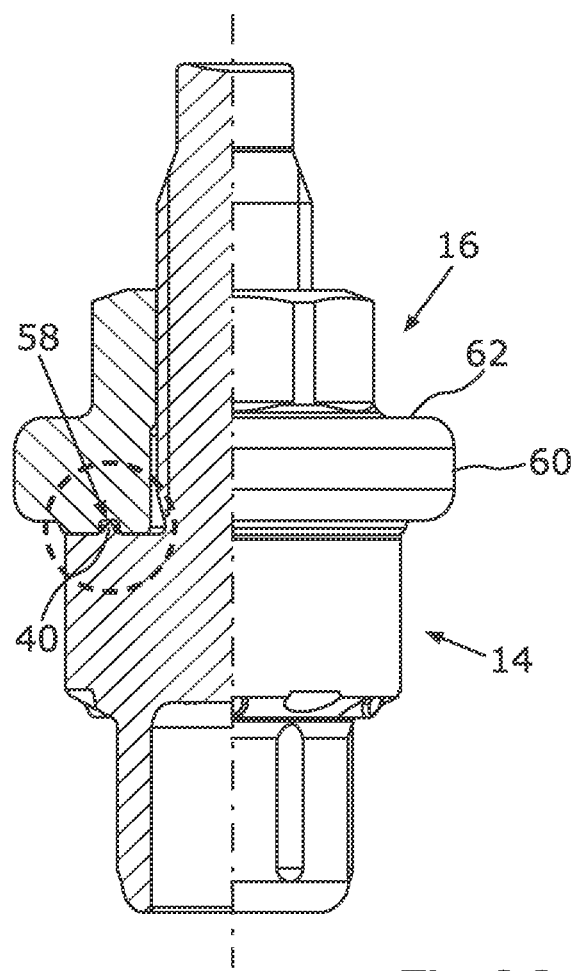
Figure 3D:
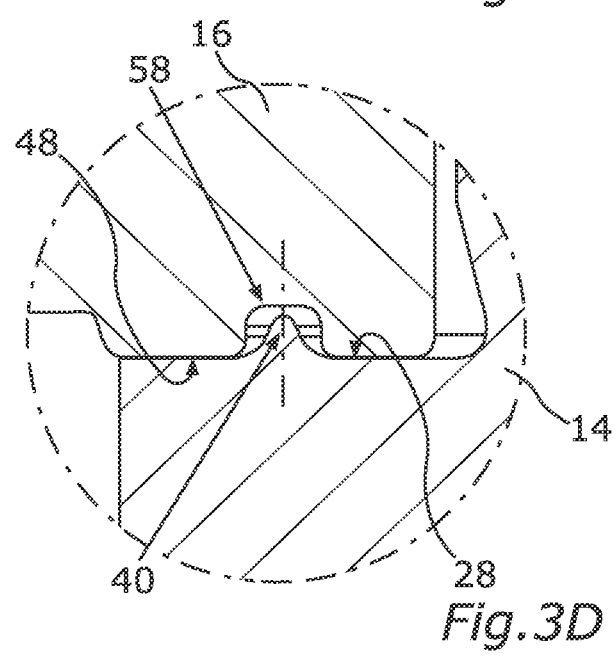
Figure 3E:
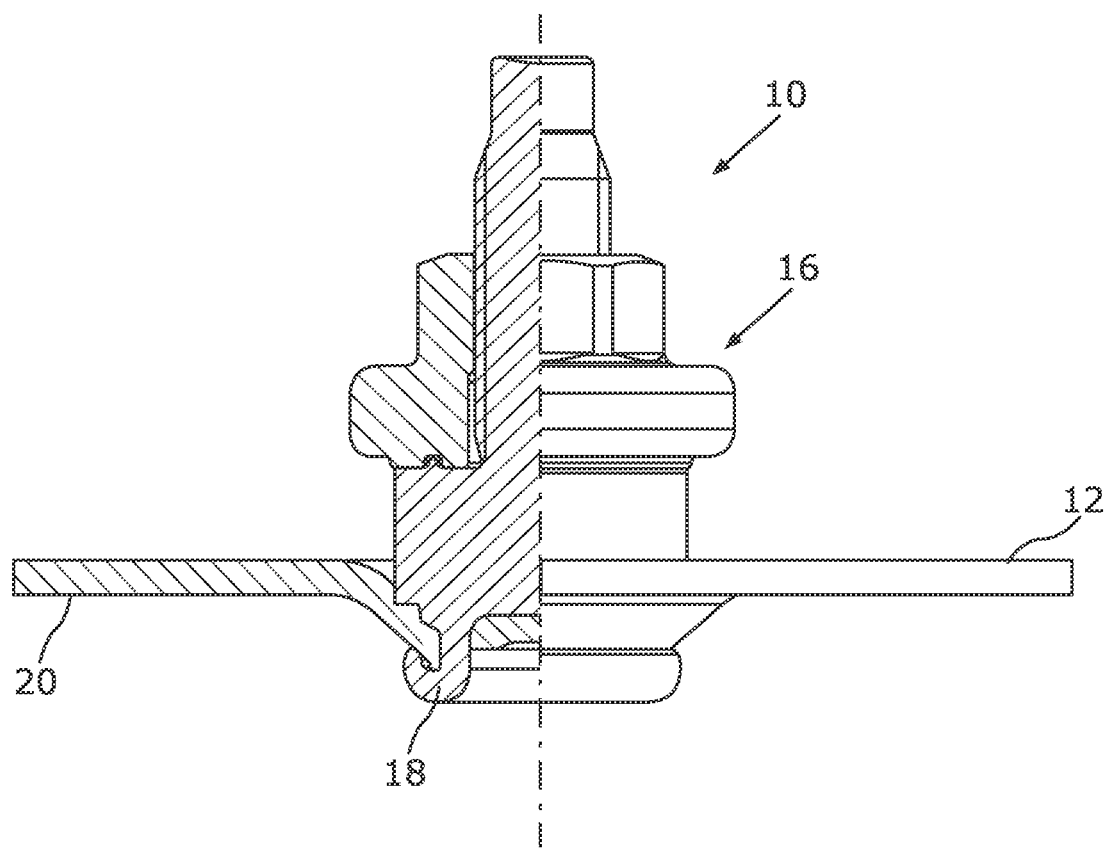
Figure 3F:
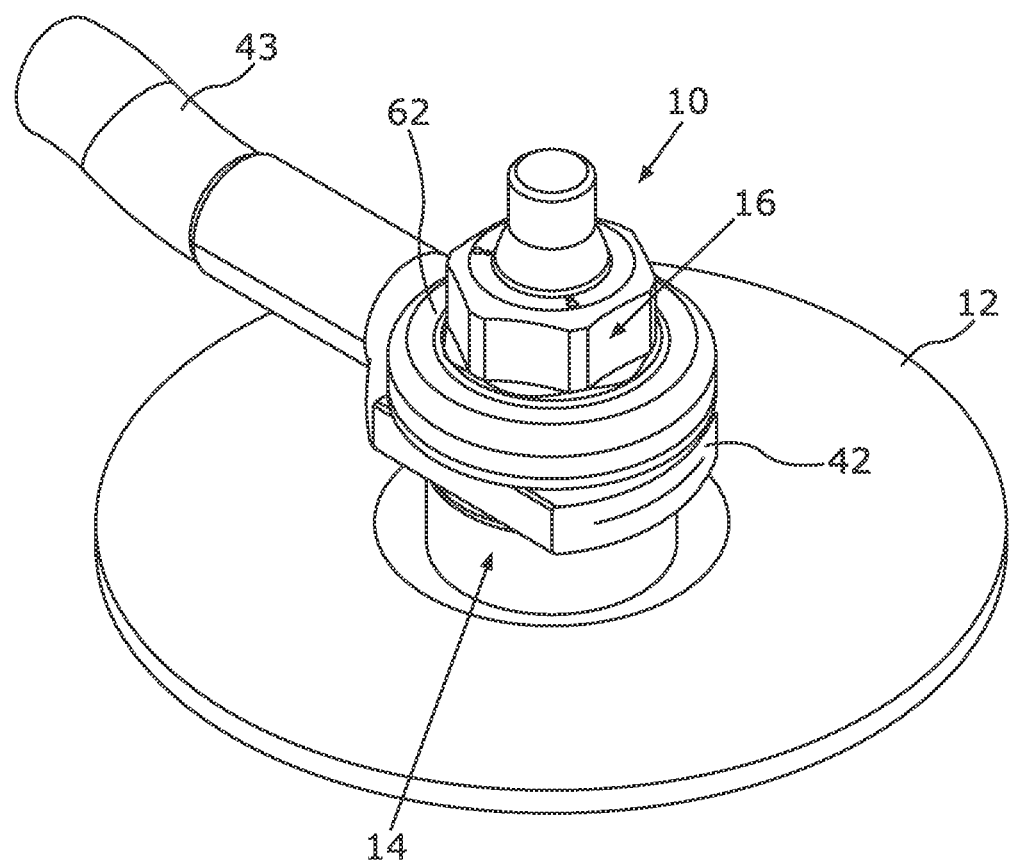
Figure 3G:
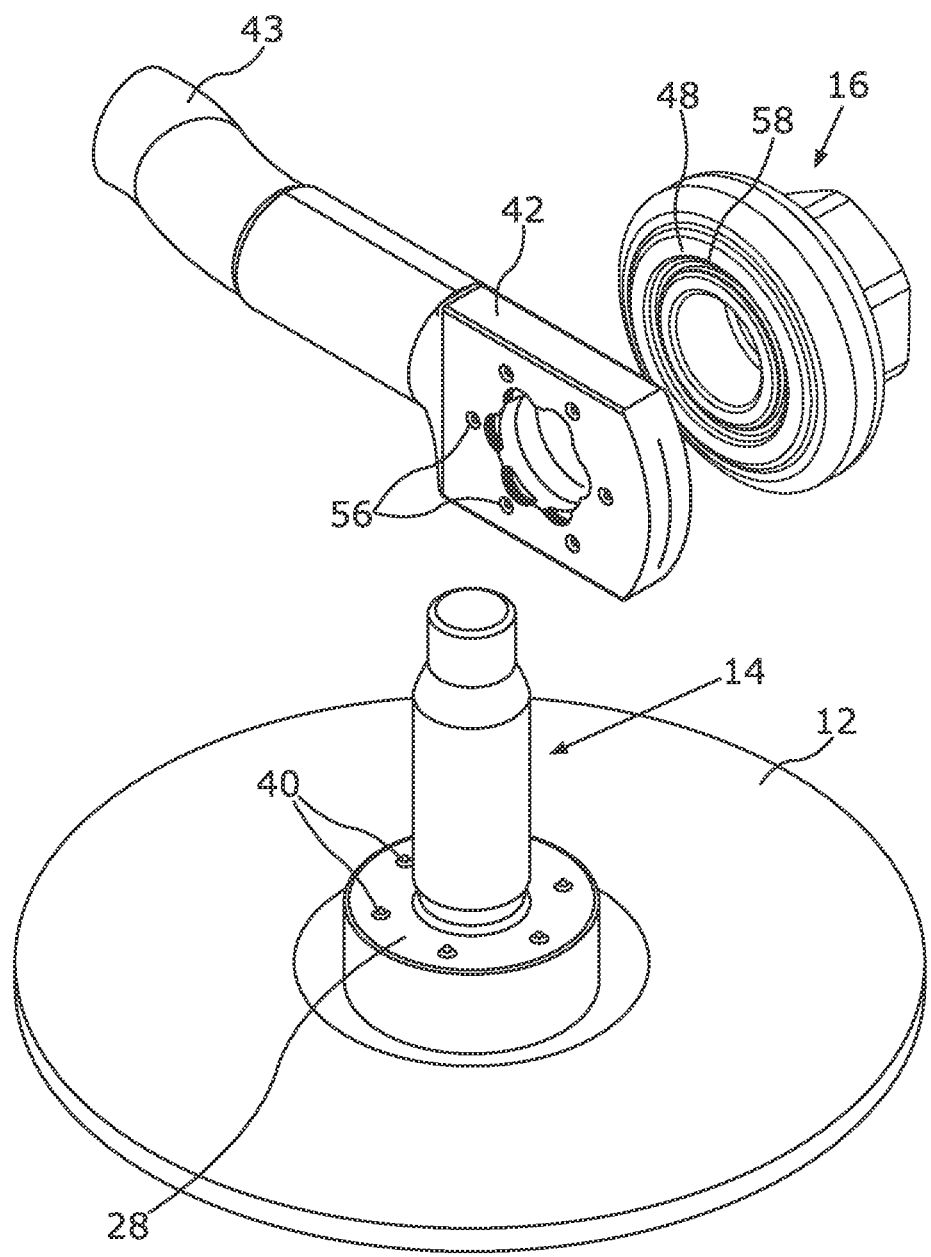
Figure 4A:
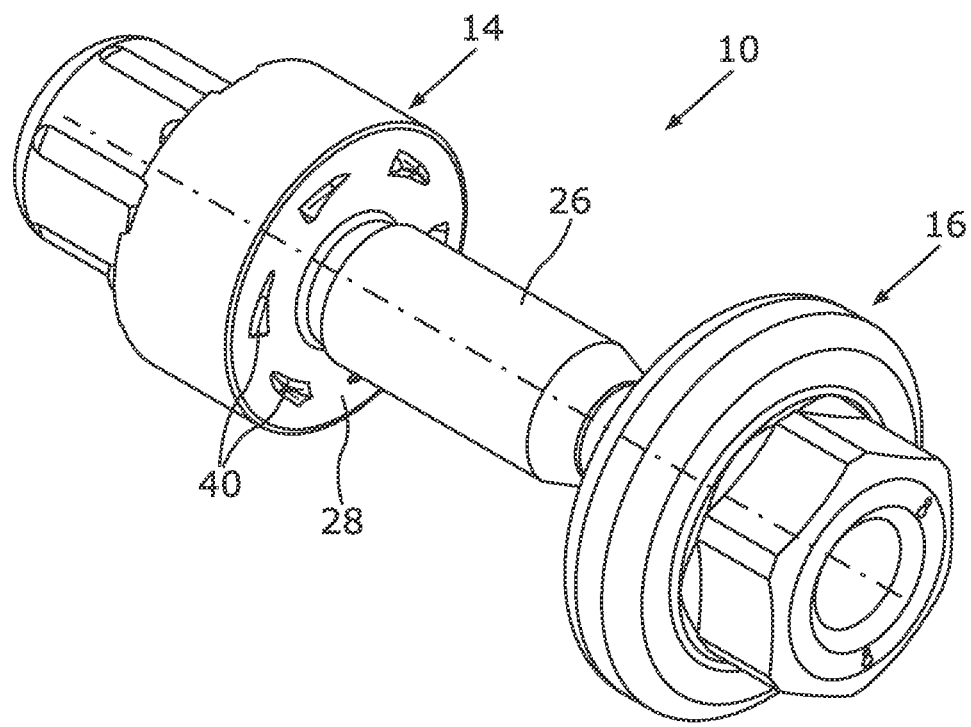
Figure 4B:
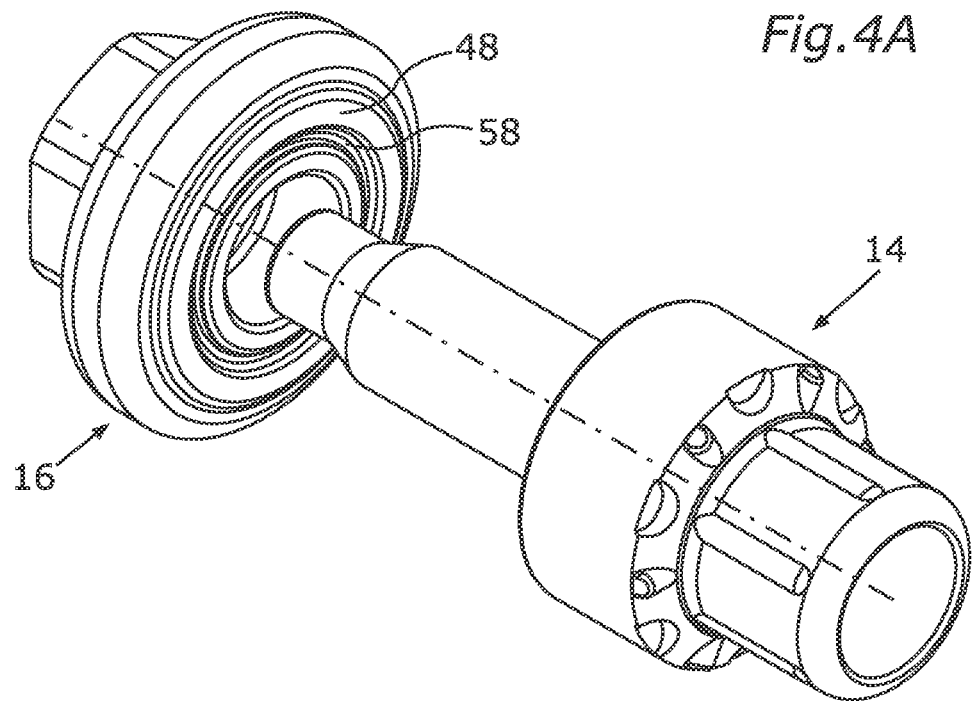
Figure 4C:
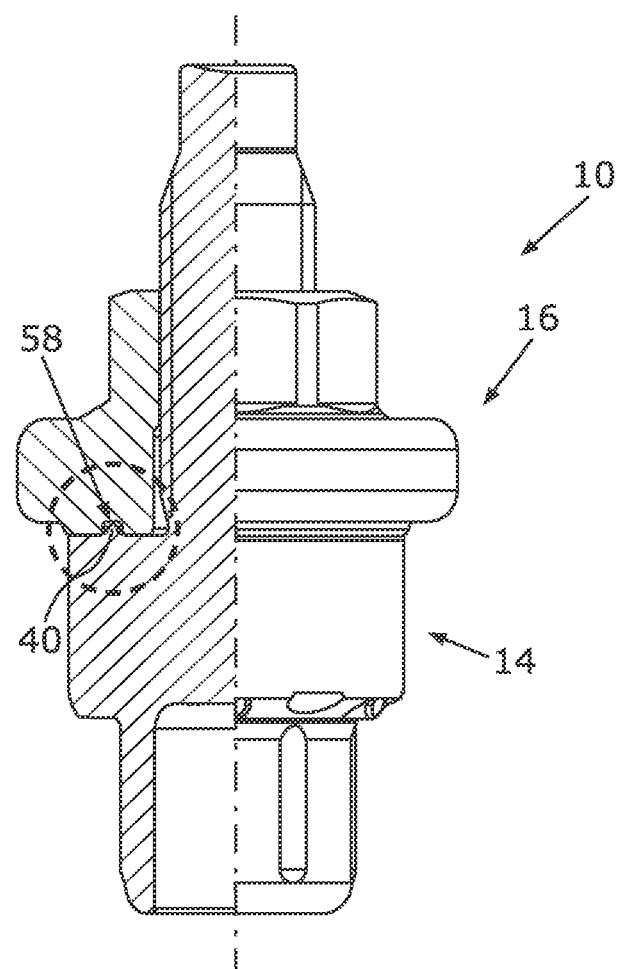
Figure 4D:
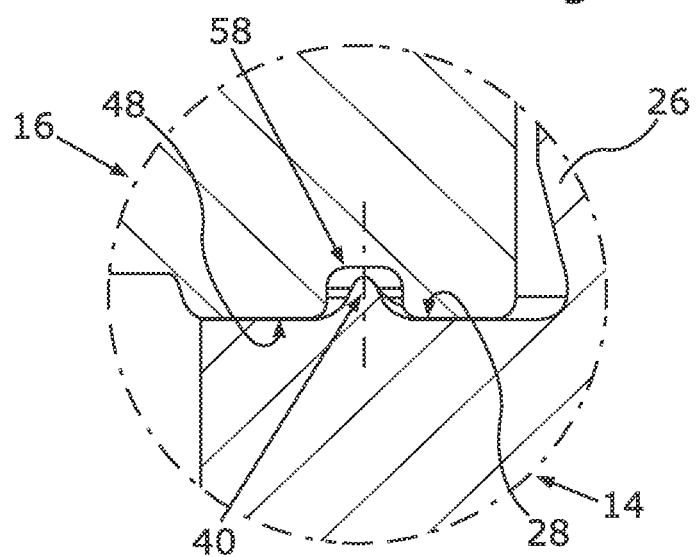
Figure 4E:
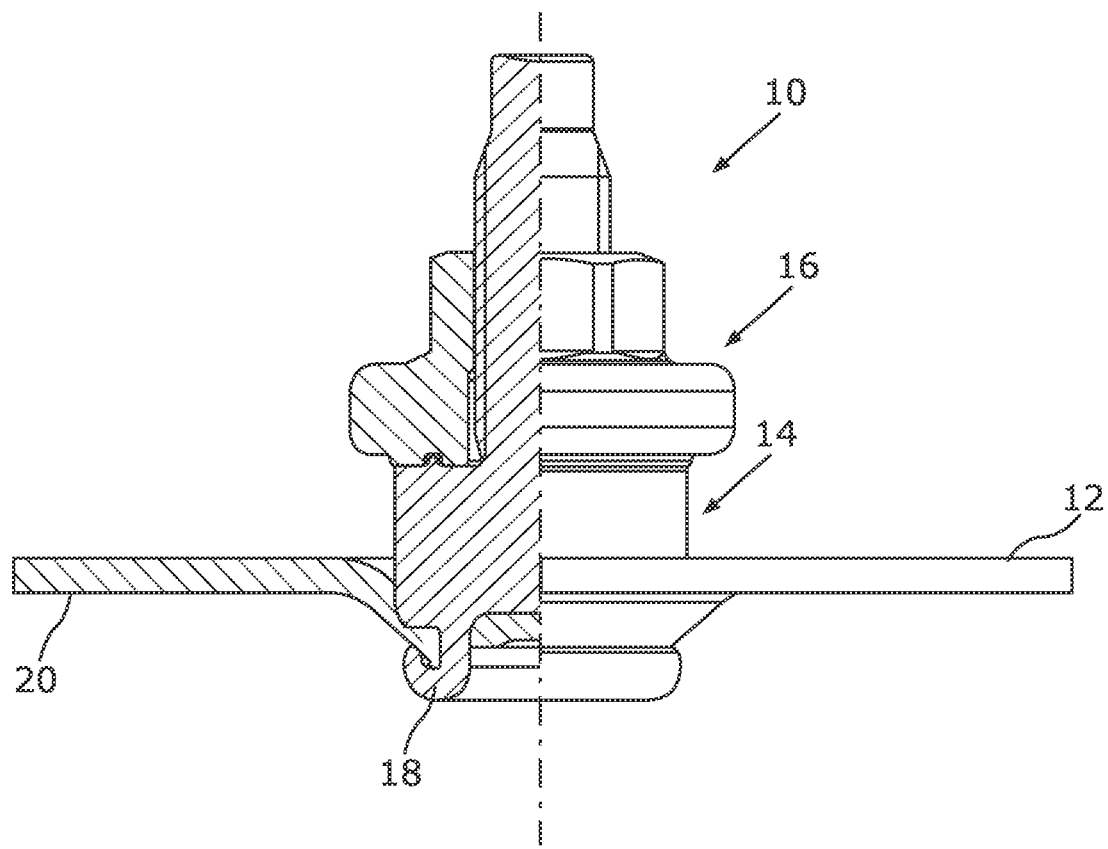
Figure 4F:
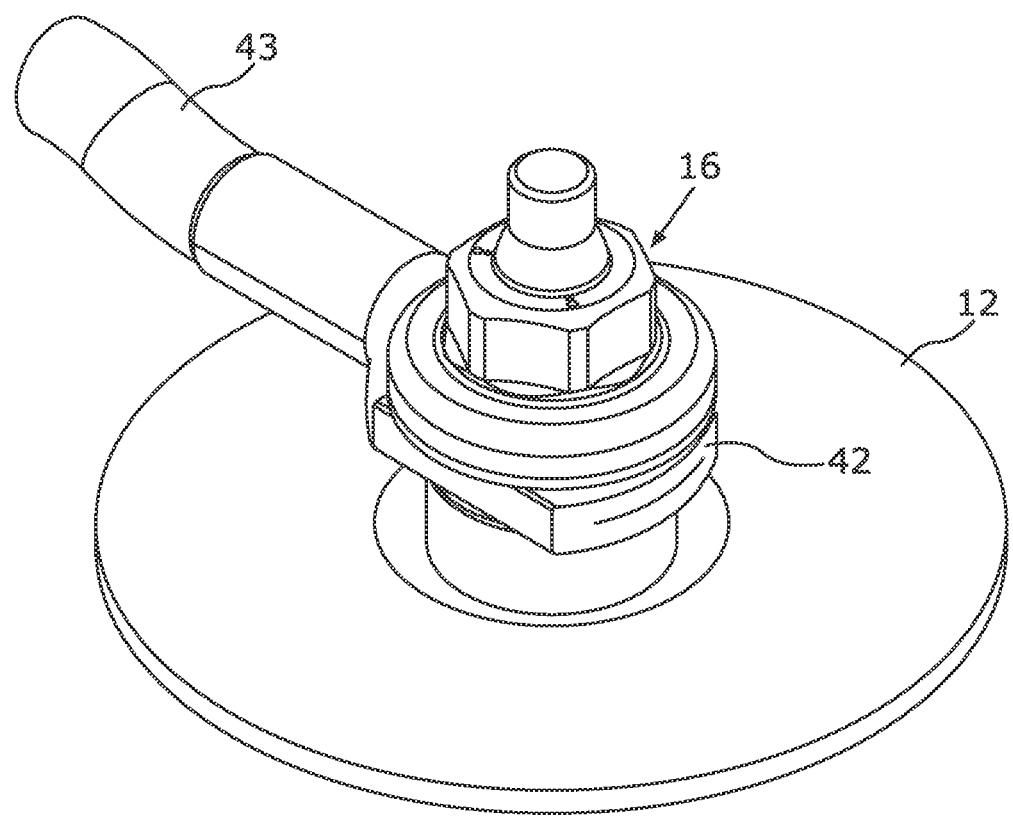
Figure 4G:
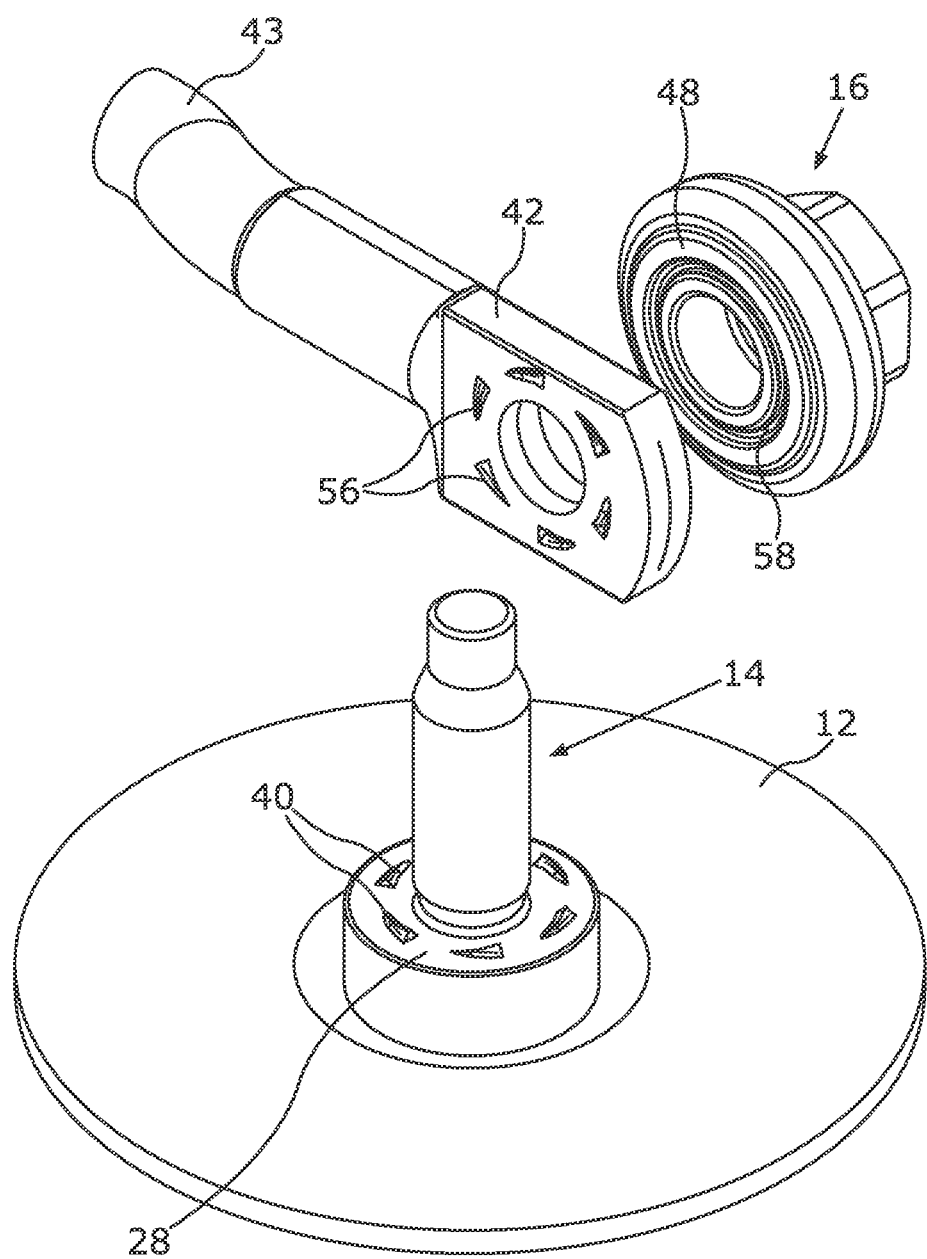
Figure 5A:
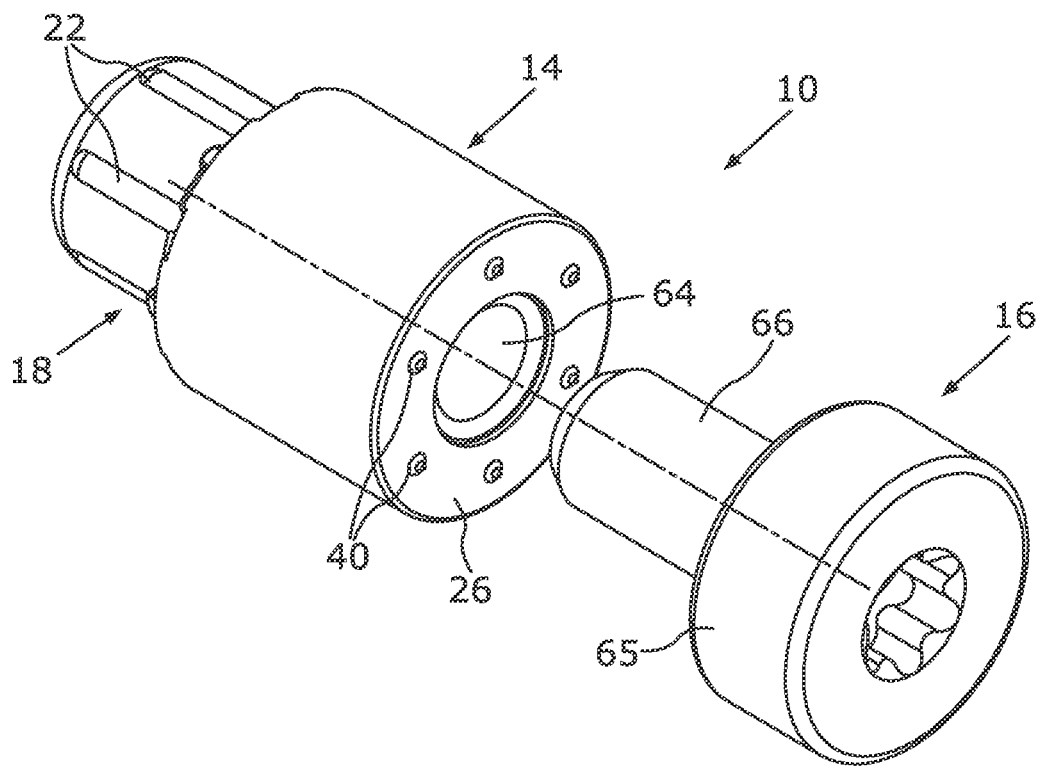
Figure 5B:
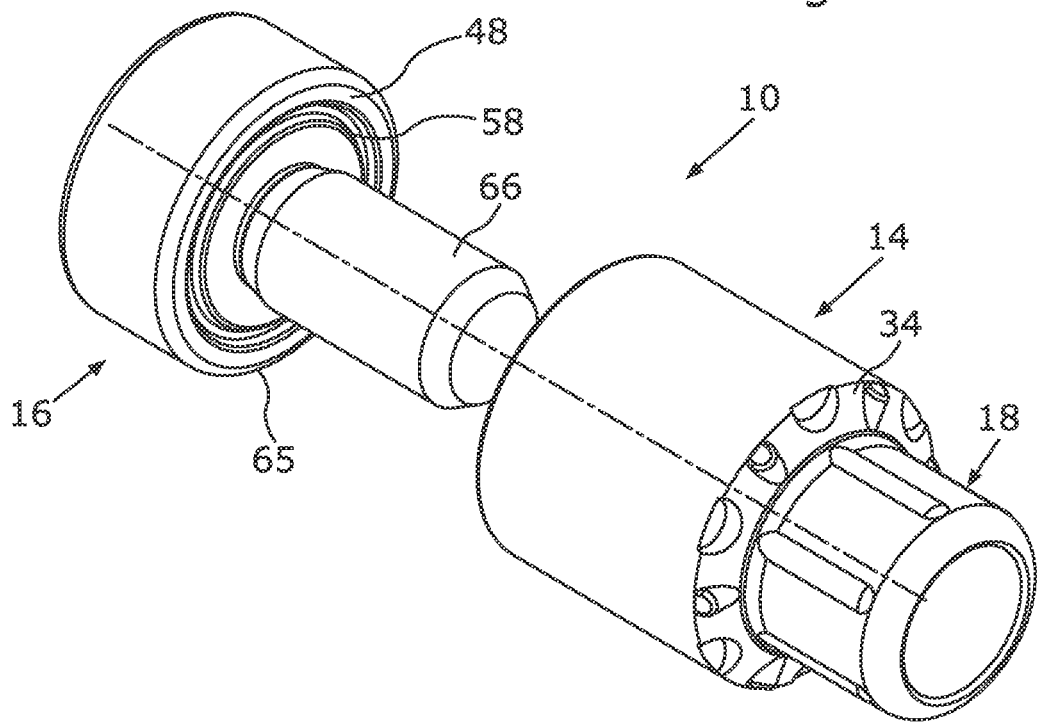
Figure 5C:
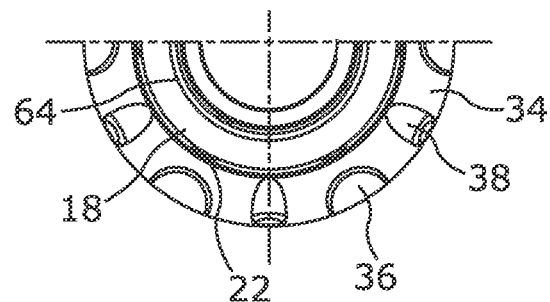
Figure 5D:
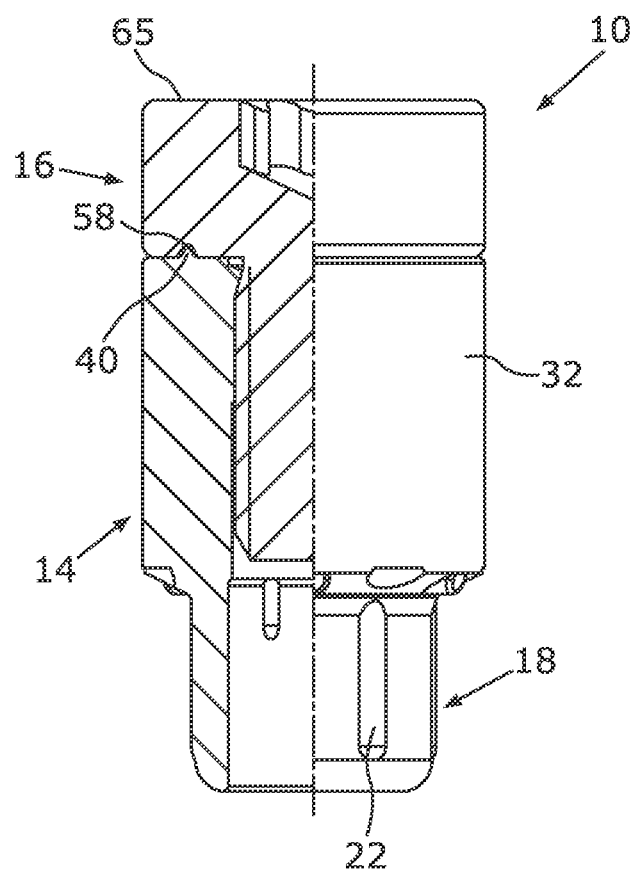
Figure 5E:
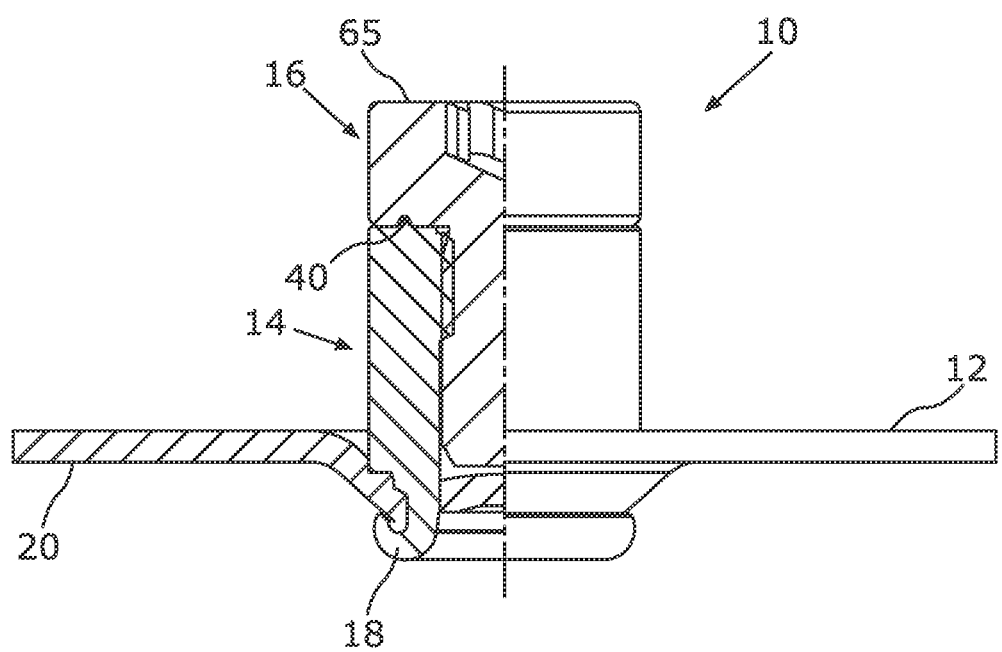
Figure 5F:
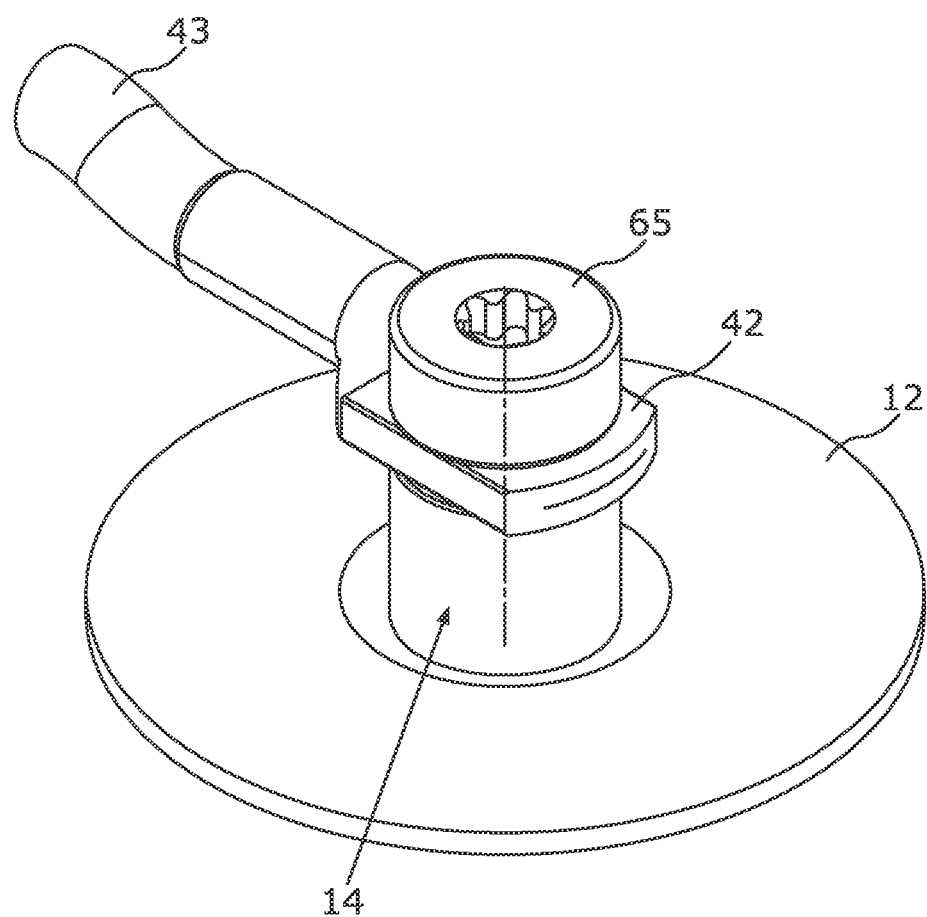
Figure 5G:
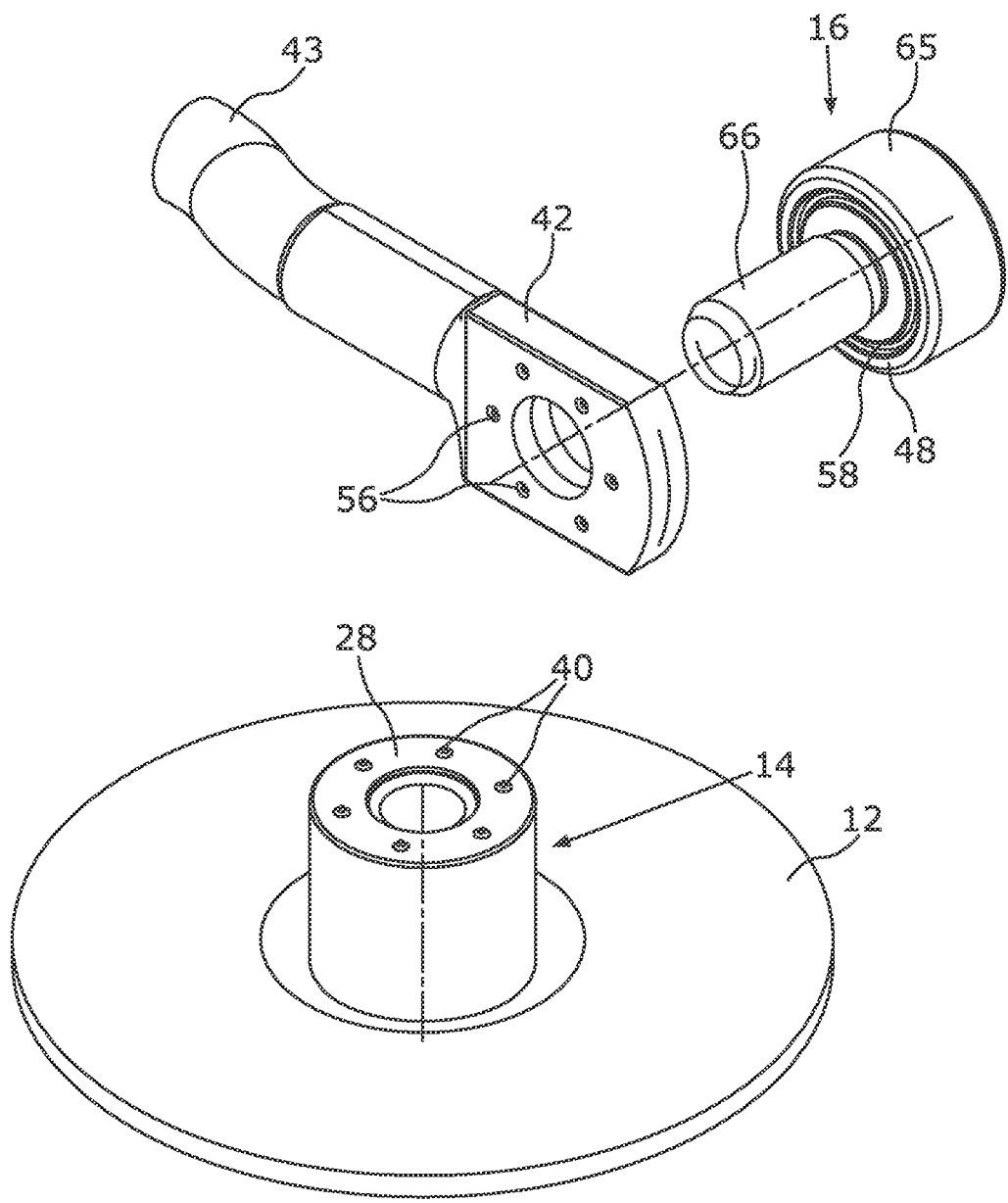

The invention will be described in more detail in the following with reference to embodiments and to the Figures. There are shown:

FIG. 1A a perspective representation of a functional unit having a fastening element and a fixing element with a flower-shaped security against rotation;

FIG. 1B a perspective representation rotated by 180° of the functional unit in accordance with FIG. 1A;

FIG. 1C a cross-sectional view of the assembled functional unit in accordance with FIG. 1A;

FIG. 1D a detailed view of a cross-section of the head part support surface in accordance with FIG. 1A;

FIG. 1E a cross-sectional view of a component assembly comprising a workpiece and the assembled functional unit in accordance with FIG. 1A;

FIG. 1F a perspective view of the component assembly in accordance with FIG. 1E with an attachment part fastened thereto;

FIG. 1G a perspective view of the component assembly in accordance with FIG. 1F in an again disassembled state;

FIG. 2A a perspective representation of a functional unit having a fastening element and a fixing element with a hexagonal security against rotation;

FIG. 2B a perspective representation rotated by 180° of the functional unit in accordance with FIG. 2A;

FIG. 2C a cross-sectional view of the assembled functional unit in accordance with FIG. 2A;

FIG. 2D a cross-sectional view of a component assembly comprising a workpiece and the assembled functional unit in accordance with FIG. 2A;

FIG. 2E a perspective view of the component assembly in accordance with FIG. 2D with an attachment part fastened thereto;

FIG. 2F a perspective view of the component assembly in accordance with FIG. 2E in an again disassembled state;

FIG. 3A a perspective representation of a functional unit having a fastening element and a fixing element with a spike security against rotation;

FIG. 3B a perspective representation rotated by 180° of the functional unit in accordance with FIG. 3A;

FIG. 3C a cross-sectional view of the assembled functional unit in accordance with FIG. 3A;

FIG. 3D a detailed view of the cross-section of the head part support surface in accordance with FIG. 3A;

FIG. 3E a cross-sectional view of a component assembly comprising a workpiece and the assembled functional unit in accordance with FIG. 3A;

FIG. 3F a perspective view of the component assembly in accordance with FIG. 3E with an attachment part fastened thereto;

FIG. 3G a perspective view of the component assembly in accordance with FIG. 3F in an again disassembled state;

FIG. 4A a perspective representation of a functional unit having a fastening element and a fixing element with a wedge security against rotation;

FIG. 4B a perspective representation rotated by 180° of the functional unit in accordance with FIG. 4A;

FIG. 4C a cross-sectional view of the assembled functional unit in accordance with FIG. 4A;

FIG. 4D a detailed view of the cross-section of the head part support surface in accordance with FIG. 4A;

FIG. 4E a cross-sectional view of a component assembly comprising a workpiece and the assembled functional unit in accordance with FIG. 4A;

FIG. 4F a perspective view of the component assembly in accordance with FIG. 4E with an attachment part fastened thereto;

FIG. 4G a perspective view of the component assembly in accordance with FIG. 4F in an again disassembled state;

FIG. 5A a perspective representation of a functional unit having a nut element as a fastening element with a spike security against rotation and a fixing element;

FIG. 5B a perspective representation rotated by 180° of the functional unit in accordance with FIG. 5A;

FIG. 5C a plan view of a tool contact surface of the nut element in accordance with FIG. 5A;

FIG. 5D a cross-sectional view of the assembled functional unit in accordance with FIG. 5A;

FIG. 5E a cross-sectional view of a component assembly comprising a workpiece and the assembled functional unit in accordance with FIG. 5A;

FIG. 5F a perspective view of the component assembly in accordance with FIG. 5E with an attachment part fastened thereto; and FIG. 5G a perspective view of the component assembly in accordance with FIG. 5F in an again dismantled state.

A functional unit 10 for attachment to a workpiece 12 is shown in FIGS. 1A to 1D and a component assembly in which the functional unit 10 is attached to the workpiece 12 is shown in FIGS. 1E to G. The workpiece 12 is a sheet metal part, for example, a body component of a vehicle. The functional unit 10 comprises a fastening element 14, on the one hand, and a fixing element 16, on the other hand, wherein the fastening element 14 and the fixing element 16 are each formed from a metal.

The fastening element 14 is provided for a rotationally fixed fastening to the workpiece 12 and has a fastening section 18 for this purpose. The fastening section 18 is configured as a cylindrical, hollow, deformable rivet section that is guided through or punches out a hole in the workpiece 12 (self-piercing fastening element) and that is beaded over on a lower side 20 of the workpiece 12 to attach the fastening element 14 to the workpiece 12 (FIG. 1E, the indication "below" or "lower side" is only to be understood with respect to the orientation of the component assembly in the drawing, whereas the orientation of the fastening element 14 and of the workpiece 12 can generally be arbitrary). In the resulting component assembly (FIG. 1E), the rivet section 18 engages behind the lower side 20 of the workpiece 12 and is in this way fastened thereto in a form-fitted manner and in a manner secure against being pulled out.

In the embodiment example shown, the fastening section 18 has a plurality of rib-shaped elevated portions 22 that are arranged distributed in the peripheral direction on an outer contour of the fastening section 18 and that extend along the longitudinal axis L of said fastening section 18 that coincides with the longitudinal axis L of the fastening element 24 and of the total functional unit 10. In the component assembly from FIGS. 1E to 1G, the rib-shaped elevated portions 22 cooperate with the sheet material of the workpiece 12 to anchor the fastening element 18 in the workpiece 12 in a rotationally fixed manner.

Along the longitudinal axis L of the fastening element 14, a head part 24 adjoins the fastening section 18 in the axial direction. To additionally improve the rotational strength of the fastening element 14 in the workpiece 12, the head part 24 has additional features providing security against rotation at its workpiece contact surface 34 facing the fastening section 18 in the form of elevated portions 36 and depressions 38 (FIG. 1B) which dig into the material of the workpiece 12 or into which material of the workpiece 12 flows during the fastening of the fastening element 14.

The head part 24 comprises a functional section 26 that is configured as a shaft part 25 in the present embodiment such that the fastening element 14 of FIGS. 1A to 1G is a bolt element. The functional section 26 is provided to receive an attachment part 42 and a fixing element 16 (FIG. 1F). The shaft part 25 extends in the axial direction, starting from a head part support surface 28 of the head part 24, and is provided with an external thread 30.

The head part support surface 28 extends in the radial direction perpendicular to the longitudinal axis L of the fastening element 14 at the side of the head part 24 remote from the fastening section 18. The head part support surface 28 is substantially designed in ring shape and is arranged concentrically to the functional section 26. The head part support surface 28 extends in the radial direction around the shaft part 25 up to an outer contour 32 of cylinder jacket shape of the head part 24 arranged at the outer side.

In addition to the fastening element 14, the functional unit 10 comprises a fixing element 16 that can be fixed to the functional section 26 of the fastening element 14 by means of a rotational movement. The fixing element 16 is a fixing nut having an axial passage opening 44 that extends from a radially extending first end face 46 to a fixing element support surface 48 that likewise extends radially.

An internal thread 50 is arranged in the axial passage opening 44 of the fixing nut and is formed complementary to the external thread 30 of the shaft section 25 such that the fixing nut can be screwed onto the functional section 26 of the fastening element 14 (see FIG. 1C). In a state installed at the fastening element 14, the fixing nut 16 is oriented such that the head part support surface 28 and the fixing element support surface 48 face one another and are aligned in parallel with one another such that they can be brought into contact with one another (FIG. 1D).

For the tightening to the functional section 26 (and for the release), the fixing nut 16 has, at the side of the first end face 46, a hexagonal outer contour 52 that serves as an engagement surface for a screwing tool. By screwing the fixing nut 16 onto the functional section 26 of the fastening element 14 and tightening the fixing nut 16, the fixing element support surface 48 and the head part support surface 28 can be pressed against one another such that an attachment part, for example a cable lug 42 (FIG. 1F), can also be fastened to the functional unit 10 by clamping.

So that the cable lug 42 can be fastened to the functional unit 10 fastened in the workpiece without said cable lug 42 rotating along on the tightening of the fixing nut 16 and there being a risk of damage to the cable 43 in this way, the head part support surface 28 has a feature providing security against rotation 40 that projects from the surface and that is flower-shaped in the embodiment shown. The feature providing security against rotation adjoins the functional section 26 directly at the radial outer side and completely extends in the peripheral direction and around said functional section 26. The feature providing security against rotation 40 is configured to dig into the material of an attachment part to be connected to the functional unit 10, for example into the material of the cable lug 42, such that said attachment part is fixed in a manner secure against rotation relative to the fastening element 14 of the functional unit 10.

To fix the cable lug 42, which has no specific properties or shape features, to the workpiece 12 by means of the functional unit 10, the fixing nut 16 is first removed from the shaft part 25 of the bolt element 14, starting from the component assembly in accordance with FIG. 1E, and the cable lug 42 is plugged onto the functional section 26 of the fastening element 14 by means of the opening 54. The fixing nut 16 is subsequently again screwed onto the external thread 30 of the shaft part 25 and tightened by means of a screwing tool and the hexagonal engagement surface 52.

In this respect, the fixing nut 16 increasingly presses the cable lug 42 in the direction of the head part contact surface 28 and against the feature providing security against rotation 40 by means of the fixing element support surface 28. The material of the head part 24, of the feature providing security against rotation 40, and of the fixing element 16 can be selected such that it has a higher strength than the material of the cable lug 42. Thus, on the tightening of the fixing nut 16, the cable lug 42 is clamped between the head part support surface 28 of the fastening element 14 and the fixing element contact surface 48 of the fixing element, on the one hand. In addition, the feature providing security against rotation 40 digs into the material of the cable lug 42 such that it is rotationally fixedly secured at the functional unit by the feature providing security against rotation (FIG. 1F).

If the arrangement is released again after it has been screwed together for the first time (FIG. 1G), the shape of the feature providing security against rotation 40 has, like a stamp, been imprinted as a negative 56 into the cable lug 42. At this point, it has to be pointed out again that the cable lug 42 does not have any specific shaping features prior to the first fastening to the workpiece 12 by means of the functional unit 10, in particular not the negative mold 56 of the feature providing security against rotation 40.

To fasten the fastening element 14 to the workpiece 12, a setting device comprising a punch and a die (not shown) is used that presses the fastening element 14 into the workpiece and flanges the fastening section 18 to establish a form-fitted connection of the fastening element 14 and the workpiece 12. So that the feature providing security against rotation 40 is not damaged, blunted or, flattened during the setting process and the shaping process, the fixing element is designed such that it acts as protection for the feature providing security against rotation on the insertion into the workpiece 12.

For this purpose, the fixing element support surface 48 has a rotationally symmetrical depression or recess 58 that is provided to receive the feature providing security against rotation 40 projecting from the head part support surface 28 when the fixing element 16 is installed at the fastening element 14. At the same time, the fixing element support surface 48 is at least sectionally in contact with the head part support surface 28 and so-to-say serves as a spacer so that the feature providing security against rotation 40 cannot be crushed by a further screwing or pressing together of the fixing element support surface 48 and the head part support surface 28. This can best be recognized in FIGS. 1C and 1D. For the flower-shaped feature providing security against rotation 40 from FIGS. 1A to 1G, the recess 58 is arranged at the radial inner side in the axial passage opening 44 of the fixing nut 16 in a manner corresponding to the position of the feature providing security against rotation 40.

To fasten the functional unit 10 to the workpiece by means of a setting device, provision can be made that the assembled functional unit 10 (as shown in FIG. 1C) is inserted as a whole into the workpiece. For this purpose, the fixing nut 16 has a radially extending flange 60 at which the fixing element support surface 48 is also arranged. At the side remote from the fixing element support surface 48, the flange 60 has a ring-shaped surface 62 that is provided precisely to serve as a contact surface for a punch of a setting head for a pressing into the workpiece 12 (arrow S, FIG. 1C). Thus, the fastening element 14 can be subjected indirectly via the fixing element 16, specifically via the surface 62, to a press-in force by the punch S, wherein the feature providing security against rotation 40 remains protected against crushing.

Alternatively, the fastening element 14 can also be pressed into the workpiece 12 when the fixing element 16 is dismantled. For this purpose, provision can be made that the punch itself has a recess 58 that receives the feature providing security against rotation 40 and in this way protects it from damage during the punching in or pressing in (not shown).

Furthermore, it is likewise conceivable that the fastening element 14 is introduced into the workpiece when the fixing element 16 is dismantled, wherein the fastening element 14 does not yet have a feature providing security against rotation on the head part support surface 28 prior to the setting process. Rather, the punch itself, specifically a contact surface of the punch with the head part support surface 28, can support a negative mold of the desired feature providing security against rotation 40 such that, on the introduction of the fastening element 14 into the workpiece 12, the feature providing security against rotation 40 is simultaneously formed on the head part support surface 28 by the punch.

FIGS. 2A to 2E show a further functional unit 10 for attachment to a workpiece 12 and a corresponding component assembly. The embodiment corresponds in most of the components to the functional unit 10 from FIGS. 1A to 1G. Only the feature providing security against rotation 40 has a different design. In accordance with FIGS. 2A to 2E, the feature providing security against rotation 40 is likewise arranged at the radial outer side around the functional section 26. However, in accordance with FIG. 2A, the shape corresponds to a polygonal shape, specifically to a hexagonal shape. In addition, the axial extent of the feature providing security against rotation 40 is larger than known for the flower-like shape of FIG. 1A. The fixing element 16 has a correspondingly adapted cut-out or recess 58 for the hexagonal shape shown. The negative mold 56 imprinted into a cable lug 42 by the hexagonal security against rotation 40 also illustrates the effectiveness of this embodiment. The originally circular opening of the cable lug 42 now has axial depressions or grooves produced by the edges of the hexagonal shape of the feature providing security against rotation 40.

FIGS. 3A to 3G show a bolt element having a security against rotation for which a plurality of features providing security against rotation 40, specifically a plurality of spikes, are provided that are arranged in a ring shape on the head part support surface 28 in the peripheral direction concentrically to the functional section 26. The associated fixing nut 16 has a correspondingly complementary recess 58 that is suitably formed as a groove running around in a ring shape in the fixing element support surface 48 that is arranged at the radial position of the spike feature providing security against rotation. Due to the peripheral groove in the fixing element support surface 48, the fixing element 16 can be screwed onto the functional section 26 without damaging the feature providing security against rotation 40. The spikes 40 produce the negative molds 56 on the fastening of the cable lug 42.

The embodiment of FIGS. 4A to 4G is very similar in large parts to FIGS. 3A to 3G. Instead of individual spikes, the features providing security against rotation 40 are here, however, formed as wedge-shaped domes that are urged into the cable lug 42, with their widened flank at the front, on the tightening of the fixing nut 16. In this manner, an improved engagement between the cable lug 42 and the feature providing security against rotation 40 is sought after.

In FIGS. 5A to 5G, an embodiment of the functional unit 10 is finally shown that has a nut element instead of a bolt element as the fastening element 14. The functional section 26 of the nut element comprises, instead of the shaft section 25, an internal thread 64 that is arranged in the head part and that extends from the head part support surface 28 in the direction of the fastening section 18.

A screw is provided as a fixing element 16 and has an external thread 66 that corresponds to the internal thread 64 of the nut element. Apart from the "reversal" of the thread sequence with respect to the fastening element 14 and the fixing element 16, the further properties and the operation of the functional unit 10 remain valid. The fixing element contact surface 48 and a corresponding recess for the feature providing security against rotation 40 are arranged on the screw head.

A cable lug 42 is fastened to the nut element 14 in that it is placed onto the head part support surface and is subsequently fixed in a clamping manner between the head part support surface 28 and the fixing element support surface 48 by means of the external thread 66 of the screw 65.

Finally, it must be noted that the fastening element 14 can in any case also have a self-piercing fastening section 18 that can be introduced into the workpiece 12 without previously prefabricating a hole therein.

REFERENCE NUMERAL LIST 10 functional unit
12 workpiece
14 fastening element
16 fixing element
18 fastening section
20 lower side of the workpiece 12
22 rib-shaped elevated portions of the fastening section 18
24 head part
25 shaft part
26 functional section
28 head part support surface
30 external thread of the shaft part 25
32 outer contour of the head part 24
34 workpiece contact surface
36 depressions of the workpiece contact surface 34
38 elevated portions of the workpiece contact surface 34
40 feature providing security against rotation
42 cable lug
43 cable
44 axial passage opening of the fixing element 16
46 first end face
48 fixing element support surface
50 internal thread of the fixing element 16
52 hexagonal outer contour
54 opening of the cable lug 42
56 negative of the feature providing security against rotation 40
58 recess of the fixing element support surface 48

60 flange of the fixing element 16
62 ring-shaped surface of the flange 60
64 internal thread of the nut element
65 screw
66 external thread of the screw 65
L longitudinal axis
S direction of punching

The invention claimed is:

1. A functional unit in combination with a punch for attachment of the functional unit to a workpiece, said functional unit comprising:
  a fastening element having a fastening section for the rotationally fixed fastening of the functional unit to the workpiece and having a head part that adjoins the fastening section in an axial direction and that has a functional section and a head part support surface remote from the fastening section; and
  a fixing element that can be fixed to the functional section of the head part of the fastening element by means of a rotational movement and that has a fixing element support surface that, in a state of the fixing element installed at the fastening element, faces the head part support surface such that an attachment part can be clamped between the head part support surface and the fixing element support surface,
    wherein the head part support surface has at least one feature providing security against rotation that projects from the surface and that is configured to at least sectionally deform the material of the attachment part, and
    wherein a contact surface of the punch has recesses which serve as a negative mold for at least one feature providing security against rotation and into which material of the head part support surface flows during the pressing of the contact surface onto the head part support surface such that at least one feature providing security against rotation is formed on the head part support surface during the pressing in.

2. The functional unit in accordance with claim 1, wherein the head part support surface is designed in ring shape.

3. The functional unit in accordance with claim 1, wherein a plurality of features providing security against rotation are provided that are arranged distributed in a peripheral direction.

4. The functional unit in accordance with claim 1, wherein the fixing element support surface has at least one depression or recess that is configured, in a state of the fixing element installed at the fastening element, to receive the at least one feature providing security against rotation projecting from the head part support surface while the fixing element support surface is at least sectionally in contact with the head part support surface.

5. The functional unit in accordance with claim 4, wherein the depression or recess comprises at least one ring-shaped peripheral groove.

6. The functional unit in accordance with claim 1, wherein the at least one feature providing security against rotation projecting from the head part support surface surrounds the functional section at a radial outer side.

7. The functional unit in accordance with claim 1, wherein the fastening section comprises a deformable rivet section.

8. The functional unit in accordance with claim 1, wherein the fastening element is a bolt element whose functional section comprises a shaft part adjoining the head part support surface at the side thereof in the axial direction.

9. The functional unit in accordance with claim 1, wherein the fastening element is a nut element whose functional section comprises an internal thread arranged in the head part.

10. The functional unit in accordance with claim 9, wherein the internal thread extends in the axial direction from the head part support surface in the direction of the fastening section.

11. The functional unit in accordance with claim 1, wherein the fixing element is configured as a fixing nut that has an axial passage opening, which extends from a radially extending first end face to the radially extending fixing element support surface, and that has an internal thread, and wherein the fixing element has a radially extending flange.

12. The functional unit in accordance with claim 11, wherein the fixing nut has an engagement surface for a screwing tool at the side of the first end face, and wherein the flange has a surface for a punch of a setting head.

13. The functional unit in accordance with claim 1, wherein the fastening element has a self-piercing fastening section.

14. A component assembly, comprising a functional unit and a workpiece, and a punch for setting the functional unit into the workpiece, said functional unit comprising:
  a fastening element having a fastening section for the rotationally fixed fastening of the functional unit to the workpiece and having a head part that adjoins the fastening section in an axial direction and that has a functional section and a head part support surface remote from the fastening section; and
  a fixing element that can be fixed to the functional section of the head part of the fastening element by means of a rotational movement and that has a fixing element support surface that, in a state of the fixing element installed at the fastening element, faces the head part support surface such that an attachment part can be clamped between the head part support surface and the fixing element support surface,
    wherein the head part support surface has at least one feature providing security against rotation that projects from the surface and that is configured to at least sectionally deform the material of the attachment part,
    wherein the fastening element of the functional unit is attached in a form-fitted manner to the workpiece by a shaping process by the punch wherein a contact surface of the punch has recesses which serve as a negative mold for at least one feature providing security against rotation and into which material of the head part support surface flows during the pressing of the contact surface onto the head part support surface such that at least one feature providing security against rotation is formed on the head part support surface during the pressing in.

15. The component assembly in accordance with claim 14, comprising an attachment part, wherein the attachment part is clamped between the head part support surface of the fastening element and the fixing element support surface of the fixing element, wherein the attachment part is in engagement with the at least one feature providing security against rotation of the head part support surface and is rotationally fixedly secured by it.

16. A component assembly in accordance with claim 15, wherein the material of the at least one feature providing security against rotation of the fastening element and/or of the fixing element, has a higher strength than that of the attachment part.

17. A method of manufacturing a component assembly comprising a functional unit and a workpiece, wherein a fastening element of the functional unit is attached in a form-fitted manner to the workpiece by a shaping process, in which the fastening element of a functional unit is pressed into or punched into a workpiece by means of a punch of a setting apparatus while the fixing element of the functional unit is dismantled, said functional unit comprising:

the fastening element having a fastening section for the rotationally fixed fastening of the functional unit to the workpiece and having a head part that adjoins the fastening section in an axial direction and that has a functional section and a head part support surface remote from the fastening section; and a fixing element that can be fixed to the functional section of the head part of the fastening element by means of a rotational movement and that has a fixing element support surface that, in a state of the fixing element installed at the fastening element, faces the head part support surface such that an attachment part can be clamped between the head part support surface and the fixing element support surface, wherein the head part support surface has at least one feature providing security against rotation that projects from the surface and that is configured to at least sectionally deform the material of the attachment part wherein the punch has a contact surface that is at least sectionally brought into engagement with the head part support surface of the fastening element to transmit a press-in force to the fastening element, wherein the contact surface of the punch has at least one depression or recess in which the at least one feature providing security against rotation projecting from the head part support surface is received during the pressing in or punching in, and wherein the contact surface of the punch has recesses which serve as a negative mold for at least one feature providing security against rotation and into which material of the head part support surface flows during the pressing of the contact surface onto the head part support surface such that at least one feature providing security against rotation is formed on the head part support surface during the pressing.

18. A method of manufacturing a component assembly comprising a functional unit and a workpiece, wherein a fastening element of the functional unit is attached in a form-fitted manner to the workpiece by a shaping process, in which the fastening element of the functional unit, is pressed into a workpiece by means of a punch of a setting apparatus while a fixing element of the functional unit is dismantled, said functional unit comprising:

the fastening element having a fastening section for the rotationally fixed fastening of the functional unit to the workpiece and having a head part that adjoins the fastening section in an axial direction and that has a functional section and a head part support surface remote from the fastening section; and a fixing element that can be fixed to the functional section of the head part of the fastening element by means of a rotational movement and that has a fixing element support surface that, in a state of the fixing element installed at the fastening element, faces the head part support surface such that an attachment part can be clamped between the head part support surface and the fixing element support surface, wherein the head part support surface has at least one feature providing security against rotation that projects from the surface and that is configured to at least sectionally deform the material of the attachment part, wherein the punch has a contact surface that is brought into engagement with the head part support surface of the fastening element to transmit a press-in force to the fastening element, wherein the contact surface of the punch has recesses which serve as a negative mold for at least one feature providing security against rotation and into which material of the head part support surface flows during the pressing of the contact surface onto the head part support surface such that at least one feature providing security against rotation is formed on the head part support surface during the pressing in.

19. A method of manufacturing a component assembly comprising a functional unit and a workpiece, wherein a fastening element of the functional unit is attached in a form-fitted manner to the workpiece by a shaping process, in which the fastening element of the functional unit in accordance with at least one of the claim 4 or 5 is pressed into the workpiece by means of a punch of a setting apparatus while the fixing element of the functional unit is installed at the fastening element such that the at least one feature providing security against rotation projecting from the head part support surface is received in the at least one depression or recess of the fixing element support surface while the fixing element support surface is at least sectionally in contact with the head part support surface, said functional unit comprising:

the fastening element having a fastening section for the rotationally fixed fastening of the functional unit to the workpiece and having a head part that adjoins the fastening section in an axial direction and that has a functional section and a head part support surface remote from the fastening section; and a fixing element that can be fixed to the functional section of the head part of the fastening element by means of a rotational movement and that has a fixing element support surface that, in a state of the fixing element installed at the fastening element, faces the head part support surface such that an attachment part can be clamped between the head part support surface and the fixing element support surface, wherein the head part support surface has at least one feature providing security against rotation that projects from the surface and that is configured to at least sectionally deform the material of the attachment part, wherein the fixing element support surface has at least one depression or recess that is configured, in a state of the fixing element installed at the fastening element, to receive the at least one feature providing security against rotation projecting from the head part support surface while the fixing element support surface is at least sectionally in contact with the head part support surface, and wherein the punch has a contact surface that is at least sectionally brought into engagement with the fixing element for an indirect transmission of a press-in force or punch-in force to the fastening element.

20. A functional unit in combination with a punch for attachment of the functional unit to a workpiece, said functional unit comprising:

a fastening element having a fastening section for the rotationally fixed fastening of the functional unit to the workpiece and having a head part that adjoins the fastening section in an axial direction and that has a functional section and a head part support surface remote from the fastening section; and a fixing element that can be fixed to the functional section of the head part of the fastening element by means of a rotational movement and that has a fixing element support surface that, in a state of the fixing element installed at the fastening element, faces the head part support surface such that an attachment part can be clamped between the head part support surface and the fixing element support surface,
wherein the head part support surface has at least one feature providing security against rotation that projects from the surface and that is configured to at least sectionally deform the material of the attachment part, and
wherein the punch has a contact surface that is at least sectionally brought into engagement with the fixing element for an indirect transmission of a press-in force or punch-in force to the fastening element.

21. A component assembly, comprising a functional unit and a workpiece and a punch for setting the functional unit into the workpiece, said functional unit comprising:

a fastening element having a fastening section for the rotationally fixed fastening of the functional unit to the workpiece and having a head part that adjoins the fastening section in an axial direction and that has a functional section and a head part support surface remote from the fastening section; and a fixing element that can be fixed to the functional section of the head part of the fastening element by means of a rotational movement and that has a fixing element support surface that, in a state of the fixing element installed at the fastening element, faces the head part support surface such that an attachment part can be clamped between the head part support surface and the fixing element support surface,
wherein the head part support surface has at least one feature providing security against rotation that projects from the surface and that is configured to at least sectionally deform the material of the attachment part,
wherein the fastening element of the functional unit is attached in a form-fitted manner to the workpiece by a shaping process by the punch which has a contact surface that is at least sectionally brought into engagement with the fixing element for an indirect transmission of a press-in force or punch-in force to the fastening element.

\* \* \* \* \*